(12) United States Patent
Asahi

(10) Patent No.: US 6,532,089 B1
(45) Date of Patent: Mar. 11, 2003

(54) OPTICAL CROSS-CONNECT, METHOD OF SWITCHING OVER OPTICAL PATH, OPTICAL ADM, AND OPTICAL CROSS-CONNECT NETWORK SYSTEM

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/376,006

(22) Filed: Aug. 19, 1999

(30) Foreign Application Priority Data

Aug. 20, 1998 (JP) ............................... 10-234245

(51) Int. Cl.$^7$ ............................................. H04J 14/02
(52) U.S. Cl. ..................... 359/128; 359/110; 359/117; 359/137
(58) Field of Search ............................. 359/110, 117, 359/128, 139

(56) References Cited

U.S. PATENT DOCUMENTS

| | | | | |
|---|---|---|---|---|
| 4,701,907 A | * | 10/1987 | Collins | |
| 5,189,410 A | * | 2/1993 | Kosugi et al. | |
| 5,303,078 A | * | 4/1994 | Brackett et al. | 359/128 |
| 5,506,713 A | * | 4/1996 | Okamoto et al. | 359/128 |
| 5,805,320 A | * | 9/1998 | Kuroyanagi et al. | 359/117 |
| 6,317,230 B1 | * | 11/2001 | Kitajima et al. | 359/117 |

FOREIGN PATENT DOCUMENTS

| | | |
|---|---|---|
| JP | 61-184996 | 8/1986 |
| JP | 5-49056 | 2/1993 |
| JP | 7-312765 | 11/1995 |
| JP | 9-163413 | 6/1997 |
| JP | 10-66109 | 3/1998 |
| JP | 10-190579 | 7/1998 |

OTHER PUBLICATIONS by Satoru Okamoto et al., "Optical Path Cross–Connect Node Architectures for Photonic Transport Network", Jun. 6, 1996, *IEEE Journal of Lightwave Technology*, vol. 14, No. 6, pp. 1410–1422.

by Chungpeng Fan, "Examining an Integrated Solution to Optical Transport Networking", Wavelength Division Multiplexing: (The first ever European meeting place for WDM Systems, Network, Marketing & Engineering Professionals), Nov. 1997, London, pp. 18–23.

* cited by examiner

*Primary Examiner*—Daniel J. Wu
(74) *Attorney, Agent, or Firm*—Young & Thompson

(57) ABSTRACT

An optical cross-connect has a plurality of input terminals to which photo signals are respectively inputted, a plurality of output terminals for respectively outputting the photo signals, and an optical switch for switching over an optical path between the input terminal and the output terminal. The optical switch, when switching over an optical path to a switchover target output terminal to which the optical path is newly connected from a pre-switchover output terminal through which the optical path is connected to the input terminal before the switchover, temporarily connects the optical path to both of the pre-switchover output terminal and the switchover target output terminal with a bridge connecting function. First and second monitor circuits for monitoring a state of the photo signal are disposed, respectively, between the input terminal and the optical switch, and between the optical switch and the output terminal. A connectivity of the optical switch is monitored from connectivity information, indicating the states of the photo signals before and after switching over the optical path, which is given from the monitor circuits. Prior to switchover of the optical path, the connectivity of the optical switch can be confirmed, and a reliability on the optical transmission system using the optical switch is thereby enhanced.

51 Claims, 36 Drawing Sheets

(a) OPTICAL REGENERATIVE FUNCTION
+ OPTICAL LEVEL MONITOR (b) OPTICAL REGENERATIVE FUNCTION
+ ELECTRIC MONITOR FUNCTION (c) OPTICAL REGENERATIVE FUNCTION
+ HEADER TERMINATING FUNCTION

OPTICAL CROSS-CONNECT, METHOD OF SWITCHING OVER OPTICAL PATH, OPTICAL ADM, AND OPTICAL CROSS-CONNECT NETWORK SYSTEM

BACKGROUND OF THE INVENTION

1. Field of the Invention

The present invention relates generally to an optical cross-connect for setting and switching over a route of photo signals by use of an optical switch, and a method of switching over the optical path by use of this optical cross-connect. The present invention relates more particularly to an optical cross-connect and a using method thereof, which are capable of confirming a connectivity of the route concerned when switching over the route of the photo signals. The present invention also relates to an optical ADM (Add/Drop Multiplexer) using the optical cross-connect, and to an optical cross-connect network system.

2. Description of the Related Art

In recent years, an optical ADM (Add/Drop Multiplexer) using an optical switch and an optical cross-connect network system are combined with a wavelength division multiplexing (WDM) technology, and are thereby capable of processing a large capacity of signals. Besides, the large capacity of signals can be switched over by the optical switch, and hence setting of a signal route (path) can be facilitated. This being the case, a variety of studies and developments of the optical cross-connect network system have been made.

A technical emphasis of the optical cross-connect network system has been so far placed on a point of how much efficiently a node-to-node signal route can be set and functions such as a protection can be actualized. On the occasion of structuring the optical cross-connect network system described above, however, an operation in the case of switching over the route of the photo signals, especially the operation in case a system failure and mis-setting happen, are not necessarily objects to be examined.

A literature cited showing the construction of this type of optical cross-connect described above may be exemplified such as, e.g., Chungpeng Fan, "Examining an integrated solution to optical transport networking.", Wavelength Division Multiplexing: (The first ever European meeting place for WDM Systems, Network, Marketing & Engineering Professionals), November 1997, London; reference pages: pp. 18–23, Satoru Okamoto et al., "Optical path cross-connect node architectures for photonic transport network.", Journal of Lightwave Technology, Vol. 14, No. 6, June 1996, pp. 1410–1422, FIGS. 4, 12.

In the conventional optical cross-connect, however, if the mis-setting is done in the optical switch, the mis-setting can be corrected for the time being. However, a given period of time is needed till the mis-setting is corrected since there was received an alarm that a desired service signal is cut off, resulting in such a problem that the service signal 1 is temporarily cut off. In the case of switching over the optical path for the photo signals, it is of much importance to confirm beforehand a connectivity of the optical path. Nevertheless, there has been no example in which that was recognized as a subject and specifically examined.

SUMMARY OF THE INVENTION

It is a first object of the present invention to provide an optical cross-connect capable of enhancing a reliability on an optical transmission system using an optical switch by making it feasible to confirm a connectivity before switching over an optical path.

To accomplish the above object, according to a first aspect of the present invention, an optical cross-connect comprises at least two photo signal input terminals for respectively inputting photo signals, at least two photo signal output terminals for respectively outputting the photo signals, and an optical switch for switching over an optical path between the photo signal input terminal and the photo signal output terminal. The optical switch incorporates a bridge connecting function of, if the optical path is switched over to a switchover target photo signal output terminal to which an optical path is newly connected from a pre-switchover photo signal output terminal through which the photo signal input terminal and the optical path are connected before the switchover, temporarily connecting the optical path to both of the pre-switchover photo signal output terminal and the switchover target photo signal output terminal.

The optical cross-connect of the present invention further comprises a second monitor circuit, disposed between the optical switch and the photo signal output unit, for monitoring a state of the output photo signal outputted from the optical switch. The optical cross-connect still further comprises a first monitor circuit, disposed between the optical switch and the photo signal input terminal, for monitoring a state of the input photo signal inputted to the optical switch.

A contrivance of the optical cross-connect according to the present invention is, in the case of switching over the optical path between the I/O terminals of the photo signals, not that the optical path is not switched over at one time but that there is performed a bridge connection of temporarily connecting the optical path to both of the pre-switchover photo signal output terminal and the switchover target photo signal output terminal. The monitor circuits for monitoring a state of the photo signals are disposed anterior and posterior to the input terminal and the output terminal of the optical switch, and are capable of monitoring the connectivity of the optical switch by comparing the states of the photo signals before and after the switching over the optical path with each other, especially the state of the photo signal outputted to the output terminal of the switch over target output terminal with the state of the photo signal before inputting to the optical switch.

In particular, with the connectivity monitor circuit being provided, it is feasible to monitor the connectivity of the optical switch from the connectivity information contained in the output photo signal and the input photo signal. The connectivity monitor circuit, if the connectivity information satisfies a predetermined fiducial quality of signal, outputs a control signal to a control circuit so that the optical switch executes a complete switchover from the pre-switchover photo signal output terminal to the switchover target photo signal output terminal.

Herein, the optical cross-connect of the present invention further comprises a photo signal cut-off unit, disposed between the photo signal input terminal and the optical switch, for cutting off the photo signal inputted to the optical switch from the photo signal input terminal. With this arrangement, other signals are inhibited from being inputted to the same optical path during the bridge connection. The control circuit controls the photo signal cut-off unit to cut off the photo signal inputted to the photo signal cut-off unit corresponding to the photo signal input terminal connected to the switchover target photo signal output terminal before switching over the optical path. Note that the connectivity information may be either an optical level of each of the input photo signal and the output photo signal or header information added to the input photo signal and to the output photo signal.

A wave-guide type optical switch can be applied as the optical switch incorporating the bridge connecting function used for the optical cross-connect of the present invention. A wave-guide type optical switch with a substrate composed of lithium niobate may be exemplified as the wave-guide type optical switch.

The optical cross-connect of the present invention may take such a configuration that the first monitor circuit includes a first optical splitter for splitting a part of the input photo signal and outputting the split input photo signal, and a light receiving element for monitoring the split input photo signal. The optical cross-connect may also take such a configuration that the first monitor circuit includes an optical level monitor circuit for monitoring an optical level of the input photo signal, a photoelectric converter for converting the input photo signal into an electric signal, and an electro-optic converter for converting the electric signal into a photo signal. Still another configuration which can be conceived is that the first monitor circuit includes a photoelectric converter for converting the input photo signal into an electric signal, an electric signal monitor circuit for monitoring the electric signal, and an electro-optic converter for converting the electric signal into a photo signal. Further, in the optical cross-connect, the first monitor circuit includes a photoelectric converter for converting the input photo signal into an electric signal, a header terminating circuit for terminating a header added to the photo signal, and an electro-optic converter for converting the electric signal into a photo signal.

According to a second aspect of the present invention, an optical cross-connect comprises a transmission-path-side input terminal for inputting a transmission path input photo signal transmitted from an optical transmission path, a transmitter-side input terminal for inputting a transmission photo signal transmitted from an optical transmitter, a transmission-path-side output terminal for outputting a transmission path output photo signal transmitted to the optical transmission path, a receiver-side output terminal for outputting a receiving photo signal transmitted to an optical receiver, and an optical switch for switching over an optical path between a photo signal input terminal including the transmission-path-side input terminal and the transmitter-side input terminal, and a photo signal output terminal including the transmission-path-side output terminal and the transmitter-side output terminal.

In the optical cross-connect having this construction according to the present invention, the optical switch has a bridge connecting function of, when the optical path is switched over to a switchover target photo signal output terminal to which the optical path is newly connected from a pre-switchover photo signal output terminal through which the optical path is connected to the photo signal input terminal before the switchover, temporarily connecting the optical path to both of the pre-switchover photo signal output terminal and the switchover target photo signal output terminal.

The optical cross-connect according to the second aspect of the present invention likewise further comprises a photo signal cut-off unit for cutting off an input of the transmission photo signal to the optical switch during a period for which the bridge connecting function of the optical switch works to temporarily connect the optical path to both of the pre-switchover photo signal output terminal and the switchover target photo signal output terminal. The connectivity information, the monitor circuits and the optical switch may take the same structures as those described above.

According to a third aspect of the present invention, an optical ADM (Add/Drop Multiplexer) can be constructed of a plurality of optical cross-connects of the present invention on the premise that the transmission path input signal, the transmission photo signal, the receiving photo signal and the transmission path output signal are inputted to one optical cross-connect and classified as photo signals belonging to the same wavelength band, and that the transmission path photo signals inputted to each optical cross-connect have wavelengths different from each other. Under this premise, the optical cross-connect may comprise an optical demultiplexer for demultiplexing transmission path input photo signals which are wavelength-multiplexed and outputting the demultiplexed photo signals to each of the optical cross-connects, and an optical coupler for coupling the transmission path output signals and outputting the coupled photo signals, thus constructing the optical ADM.

Furthermore, an optical transmission device can be also constructed of the optical ADM, described above. The optical ADM comprises a transmitting unit disposed at a transmitting-side terminal of the transmission path, and a receiving unit disposed at a receiving-side terminal of the transmission path. The transmitting unit includes an optical transmission terminal node for transmitting the photo signals belonging to the respective wavelength bands, and a transmitting-side optical coupler for coupling the photo signals and transmitting wavelength-multiplexed photo signals to the transmission path. On the other hand, the receiving unit includes an optical demultiplexer for demultiplexing the wavelength-multiplexed photo signals into the photo signals belonging to the respective wavelength bands, and an optical receiving terminal node for receiving the respective photo signals. In addition to the transmitting unit and the receiving unit, at least one optical ADM of the present invention is disposed on the transmission path, whereby the optical transmission device can be structured by use if the optical ADM.

According to a fourth aspect of the present invention, an optical ADM comprises, as a basic construction, a plurality of transmission-path-side input terminals for inputting transmission path input photo signals transmitted respectively from a plurality of optical transmission paths, a transmitter-side input terminal for inputting a transmission photo signal transmitted from an optical transmitter, transmission-path-side output terminals for outputting the transmission path output photo signals respectively outputted to the plurality of optical transmission paths, a receiver-side output terminal for outputting the receiving photo signal transmitted to an optical receiver, and an optical switch for switching over an optical path between a photo signal input terminal including the transmission-path-side input terminal and the transmitter-side input terminal, and a photo signal output terminal including the transmission-path-side output terminal and the receiver-side output terminal.

In such a construction, the optical switch has a bridge connecting function of, when the optical path is switched over to a switchover target photo signal output terminal to which the optical path is newly connected from a pre-switchover photo signal output terminal through which the optical path is connected to the photo signal input terminal before the switchover, temporarily connecting the optical path to both of the pre-switchover photo signal output terminal and the switchover target photo signal output terminal.

The optical transmission device using the optical ADM involves the use of the photo signals having the single wavelength but can be applied to the wavelength multiplexing transmission using the photo signals belonging to the wavelength bands different from each other. In the above-described construction, the transmission path input photo signals are defined as the wavelength-multiplexed photo signals in which the photo signals belonging to the wavelength bands different from each other are wavelength-multiplexed. The optical cross-connect incorporating the optical ADM function includes the optical transmitters the optical receivers, the transmission path input terminals, the transmission path output terminals, the transmitter-side input terminals and receiver-side output terminals, of which the numbers each correspond to the number of the photo signals belonging to the wavelength bands. The optical cross-connect further includes an optical demultiplexer, disposed between each of the transmission paths and the photo signal input terminal, for demultiplexing the wavelength-multiplexed photo signals into the photo signals having the respective wavelength bands, and an optical coupler, disposed between the photo signal output terminal and the transmission path, for wavelength-multiplexing the photo signals and outputting the wavelength-multiplexed photo signals to the transmission path.

Under this construction, the optical switch has a bridge connecting function of, when the optical path is switched over to a switchover target photo signal output terminal to which the optical path is newly connected from a pre-switchover photo signal output terminal through which the optical path is connected to the photo signal input terminal before the switchover between the photo signal input terminal and the photo signal output terminal of the photo signals belonging to the same wavelength band, temporarily connecting the optical path to both of the pre-switchover photo signal output terminal and the switchover target photo signal output terminal.

In the optical ADM of the present invention, in the same way as what has already been described, the monitor circuits are disposed between the optical switch and the photo signal output terminal and between the photo signal input terminal and the optical switch, and monitor the states of the photo signals before and after switching over the optical path. With this configuration, the connectivity monitor circuit is capable of monitoring the connectivity of the optical switch from the connectivity information contained in the output photo signal and the input photo signal. Similarly, the photo signal cut-off unit is disposed between the photo signal input terminal and the optical switch, whereby the photo signal inputted to the optical switch from the photo signal input terminal can be cut off.

The plurality of optical ADMs are arranged and connected as a network through the transmission paths, whereby an optical cross connect network system can be constructed.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

To start with, before describing optical cross-connect equipment of the present invention, a conventional optical cross-connect will be explained for facilitating a comprehension of the present invention.

Figure 1:
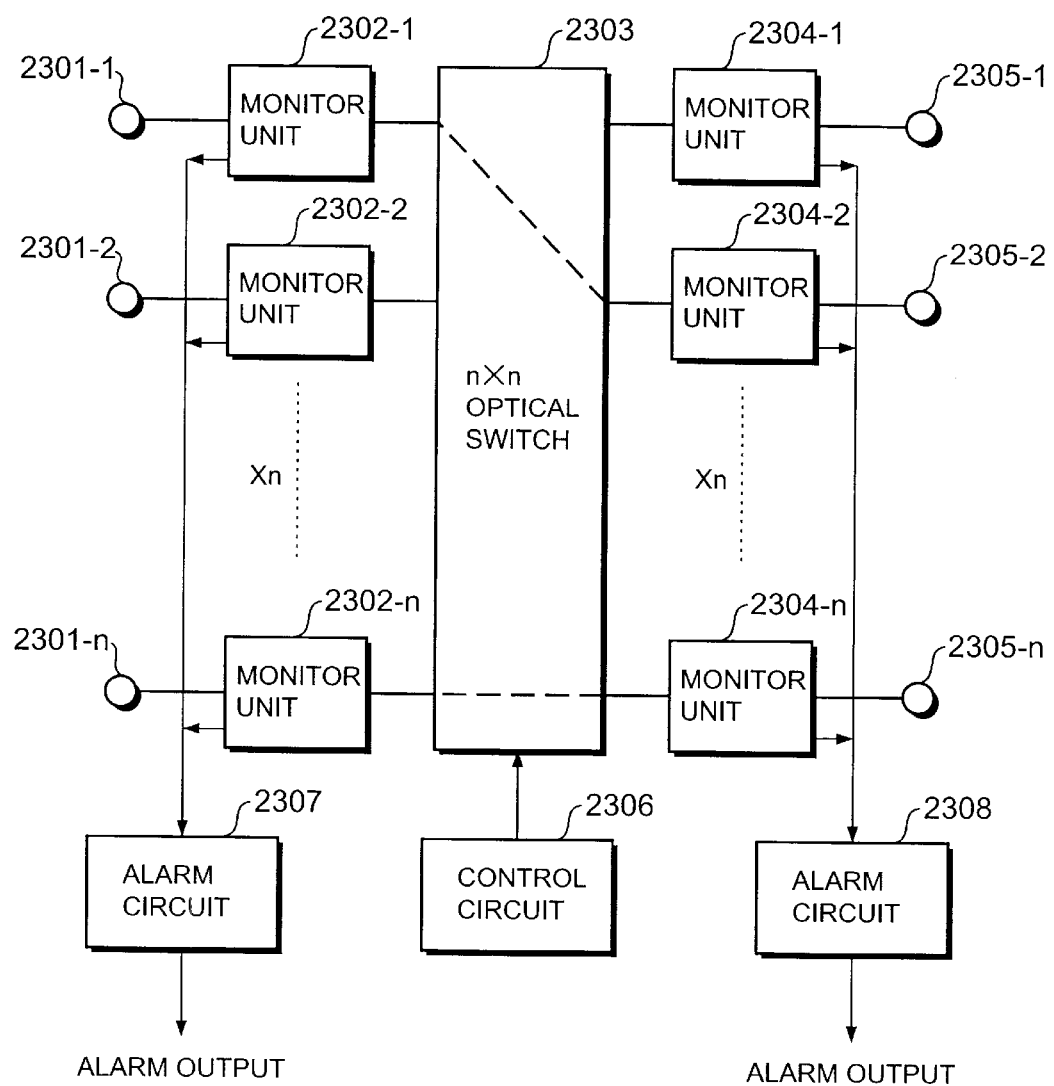
FIG. 1 is a diagram showing one example of a construction of a conventional optical cross-connect.

FIG. 1 is a diagram showing one example of an architecture of the conventional optical cross-connect. Referring to FIG. 1, there are shown photo signal input terminals 2301-1~2301-n, first monitor circuits 2302-1~2302-n, an n×n optical switch 2303, second monitor circuits 2304-1~2304-n, photo signal output terminals 2305-1~2305-n, an optical path control circuit 2306, and alarm output circuits 2307, 2308.

Photo signals inputted to the photo signal input terminals 2301-1~2301-n are inputted to the n×n optical switch 2303 via the first monitor circuits 2302-1~2302-n. In the optical switch 2303, n-pieces of input ports and n-pieces of output ports are arbitrarily selectively connected based on a control signal transmitted from the optical path control circuit 2306, and the photo signals, of which optical paths have been switched over, are outputted from th e respective output ports.

The n-lines of output photo signals outputted from the optical switch 2303 are outputted via the second monitor circuits 2304-1~2304-n to the photo signal output terminals 2305-1~2305-n. That is, the photo signals inputted to the input terminals 2301-1~2301-n, with optical paths being set in the optical switch 2303, can be outputted from desired terminals among the output terminals 2305-1~2305-n.

Herein, a signal switching-operation in the optical cross-connect based on the conventional technology will be described in somewhat greater details with reference to FIGS. 2 and 3.

Figure 2:
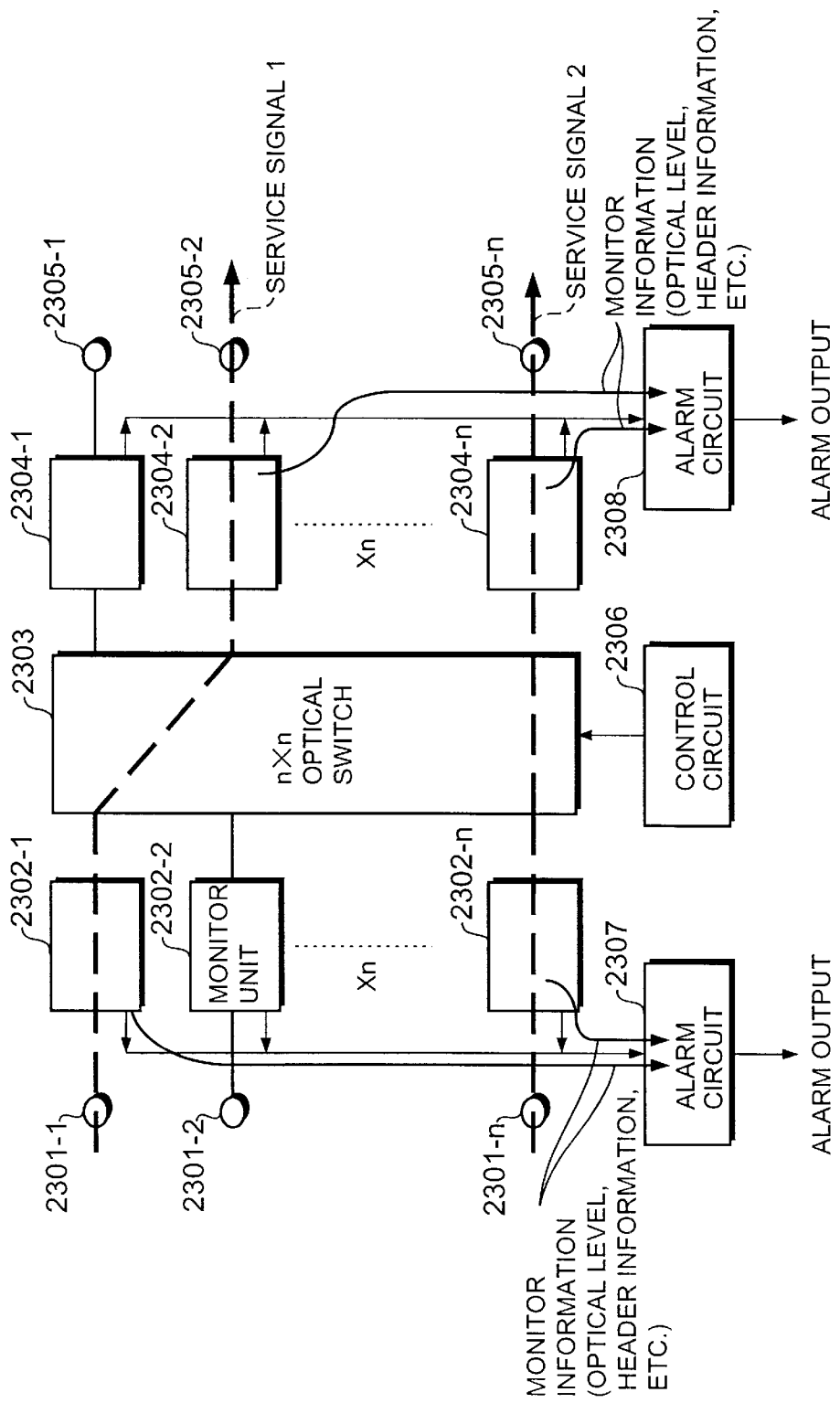
FIG. 2 is a diagram showing a state before switching over an optical path as well as showing an operation in one example of the construction of the conventional optical cross-connect.
Figure 3:
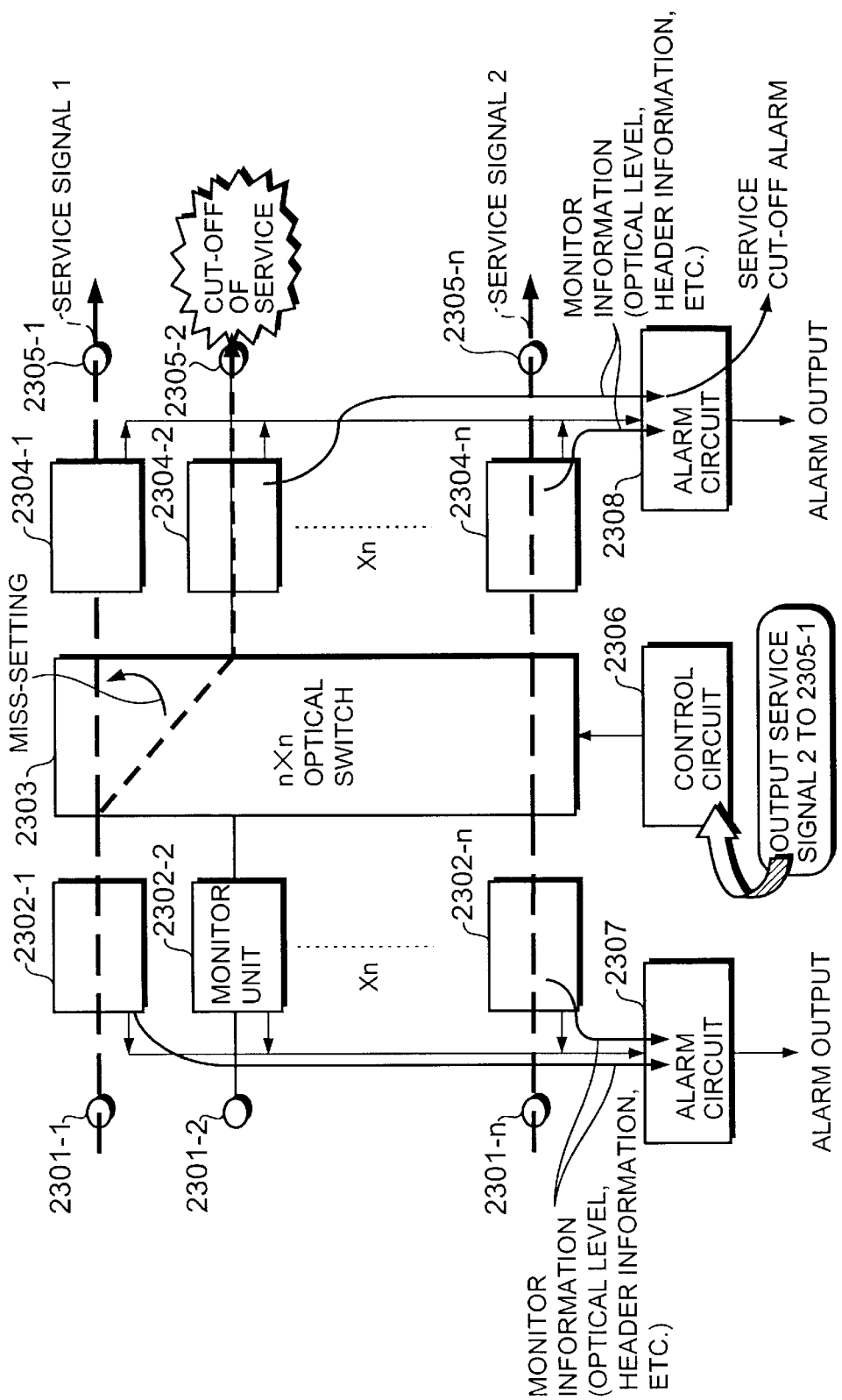
FIG. 3 is a diagram showing a state after switching over an optical path as well as showing an operation in one example of the construction of the conventional optical cross-connect.

FIG. 2 shows a state before the optical path i s switched over. Referring to FIG. 2, with the optical path being set by the optical switch 2303, a service signal 1 (which implies a working traffic) inputted to the input terminal 2301-1 is outputted to the output terminal 2305-2, while as device signal 2 inputted to the in put terminal 2301-n is outputted to the output terminal 2305-n. At this time, monitor information on the service signals 1, 2 is transmitted to an alarm output circuit 2307 from the monitor circuits 2302-1 and 2302-n. Further, the monitor circuits 2304-2 and 2304-n transmit the monitor information to the alarm output circuit 2308. States of connections posterior and anterior to an optical switch 4 are confirmed and monitored based on this item of monitor information.

Herein, the optical path cross-connect according to the prior art operates to switch over the service signal 2 to the output terminal 2305-1, however, it might happen that the service signal 1 is switched over to the output terminal 2305-1 due to mis-setting. FIG. 3 shows a state of how this happens.

At this time, with the mis-setting by the optical switch, the service signal 1 being outputted to the output terminal 2305-2 is completely switched over to the output terminal 2305-1. Even in this case, the monitor circuit 2304-2 outputs information purporting that a desired service signal is cut off, which can be notified of as an alarm. The mis-setting can be corrected with this alarm for the time being. A fixed period of time is, however, required till the mis-setting is corrected since there was received the alarm that the desired service signal was cut off, and there arises such a problem that the service signal 1 is temporarily cut off.

Next, the optical cross-connect, a method of using the optical cross-connect, an optical ADM (Add/Drop Multiplexer) and an optical cross-connect network system which use the optical cross-connect, will hereinafter be described with reference to the drawings.

Figure 4:
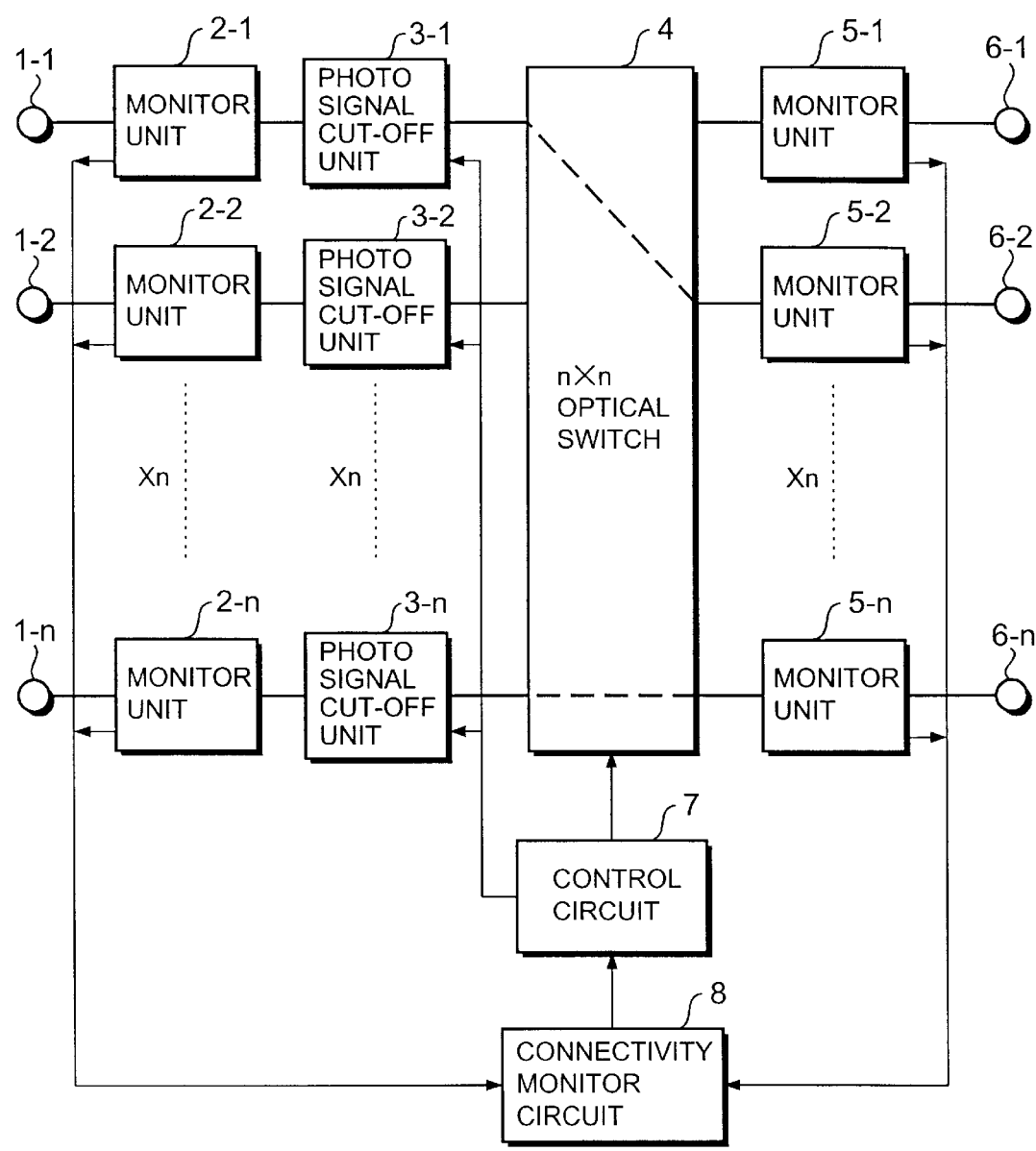
FIG. 4 is a diagram showing a construction of an optical cross-connect in a first embodiment of the present invention.

FIG. 4 is a diagram showing an architecture of the optical cross-connect in a first embodiment of the present invention. Referring to FIG. 4, there are shown photo signal input terminals 1-1~1-n, first monitor circuits 2-1~2-n, photo signal cut-off units 3-1~3-n, an n×n optical switch 4, second monitor circuits 5-1~5-n, photo signal output terminals 6-1~6-n, an optical path control circuit 7, and an connectivity monitoring circuit 8.

Photo signals inputted to the photo signal input terminals 1-1~1-n are inputted to the n×n optical switch 4 via the first monitor circuits 2-1~2-n and the photo signal cut-off units 3-1~3-n. In the optical switch 4, normally optical paths of the photo signals are arbitrarily selectively connected between n-pieces of input ports and n-pieces of output ports, based on a control signal transmitted from the optical path control circuit 7.

The n-lines of output photo signals from the optical switch 4 are outputted via the second monitor circuits to the photo signal output terminals 6-1~6-n. That is, the photo signals inputted to the input terminals 1-1~1-n are, with connection states of the optical paths being set in the optical switch 4, outputted from desired terminals among the output terminals 6-1~6-n. The first and second monitor circuits 2-1~2-n, 5-1~5-n each incorporate a function of monitoring a state of the photo signal, i.e., whether or not the photo signal is outputted at a fixed level or higher.

Next, an operation of switching the photo signal in the first embodiment will be explained referring to FIGS. 5 to 7.

Figure 5:
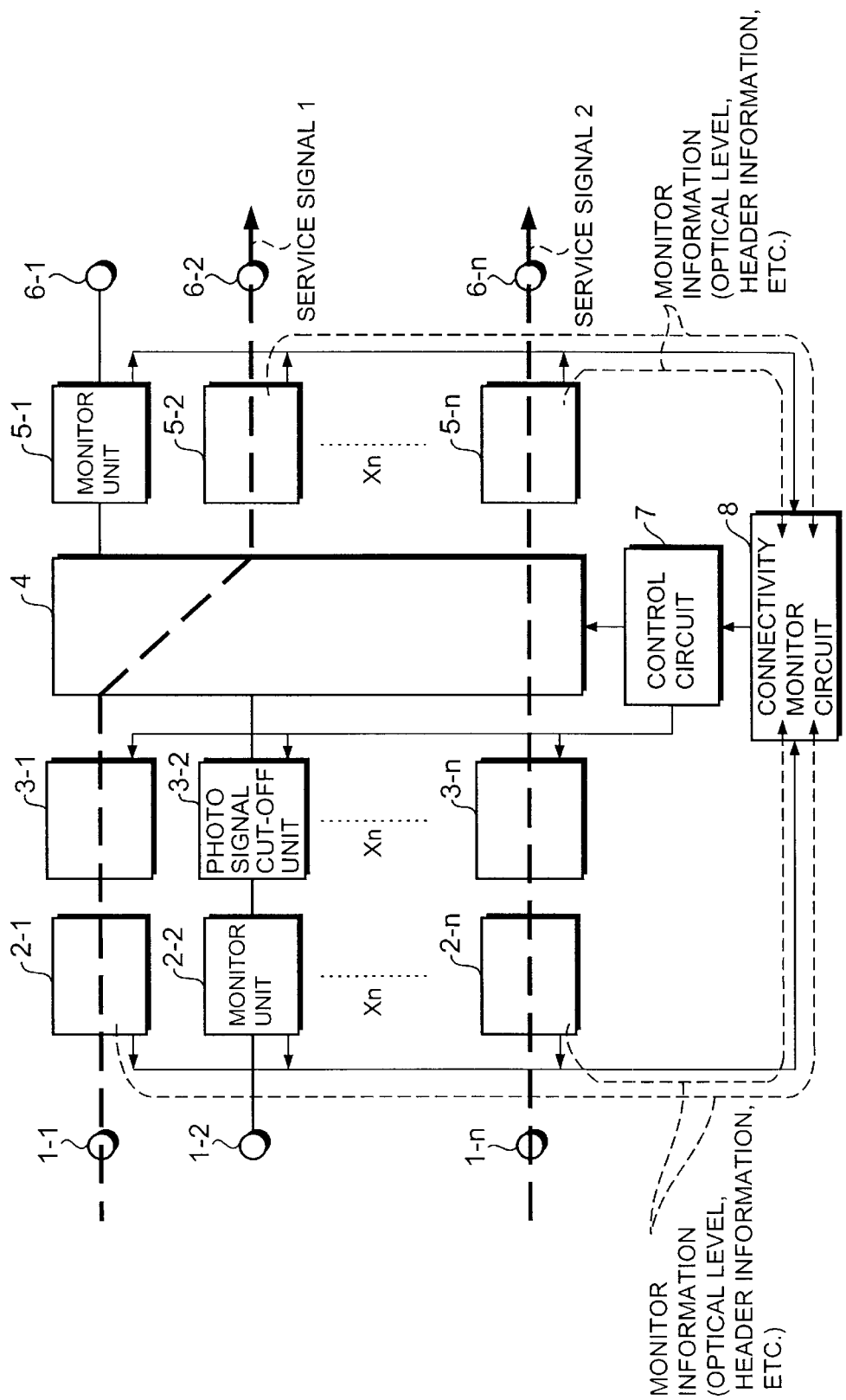
FIG. 5 is an explanatory diagram showing a state before switching over the optical path as well as showing an operation of the optical cross-connect in the first embodiment of the present invention.
Figure 6:
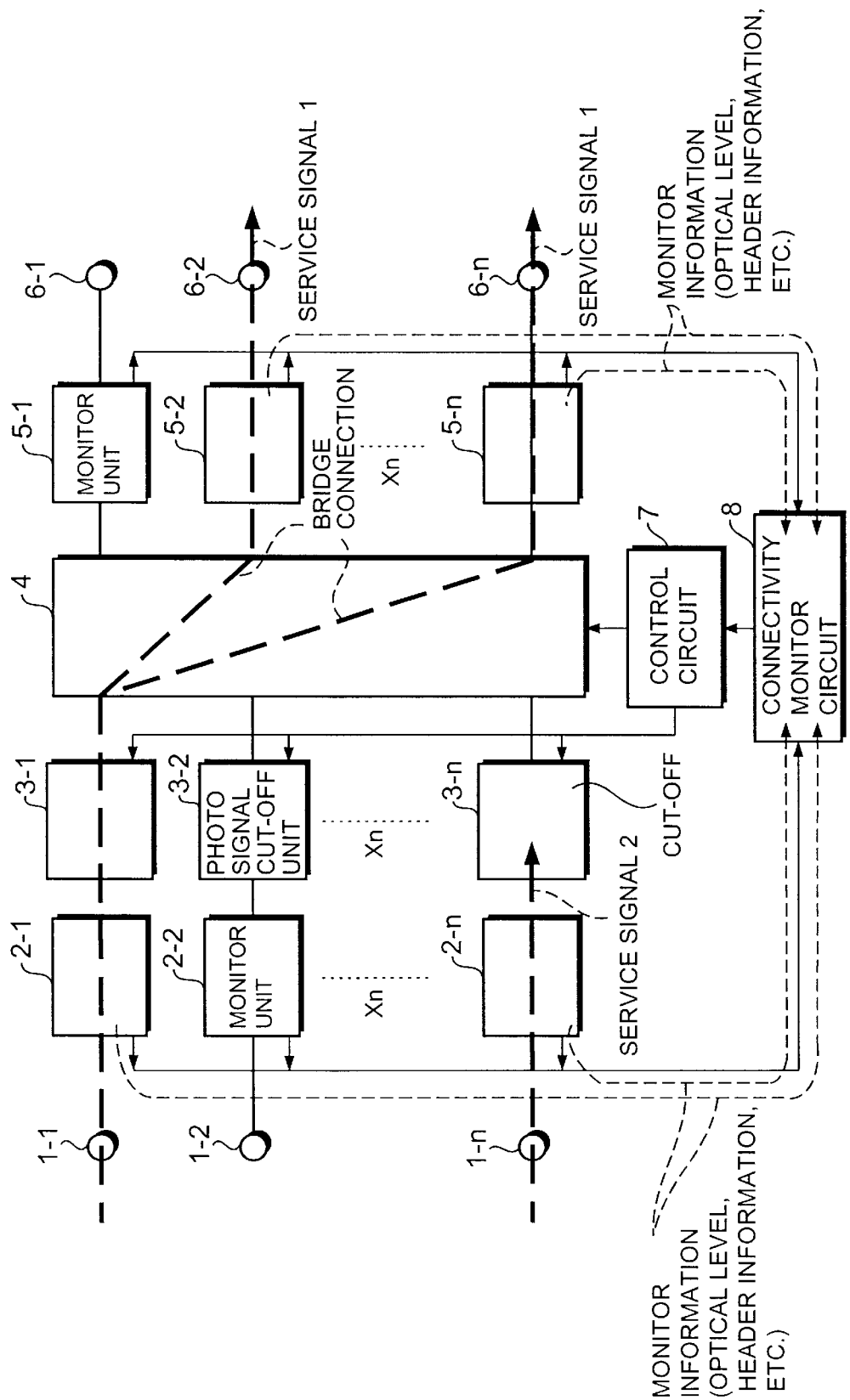
FIG. 6 is an explanatory diagram showing a bridge-connected state as well as showing the operation of the optical cross-connect in the first embodiment of the present invention.
Figure 7:
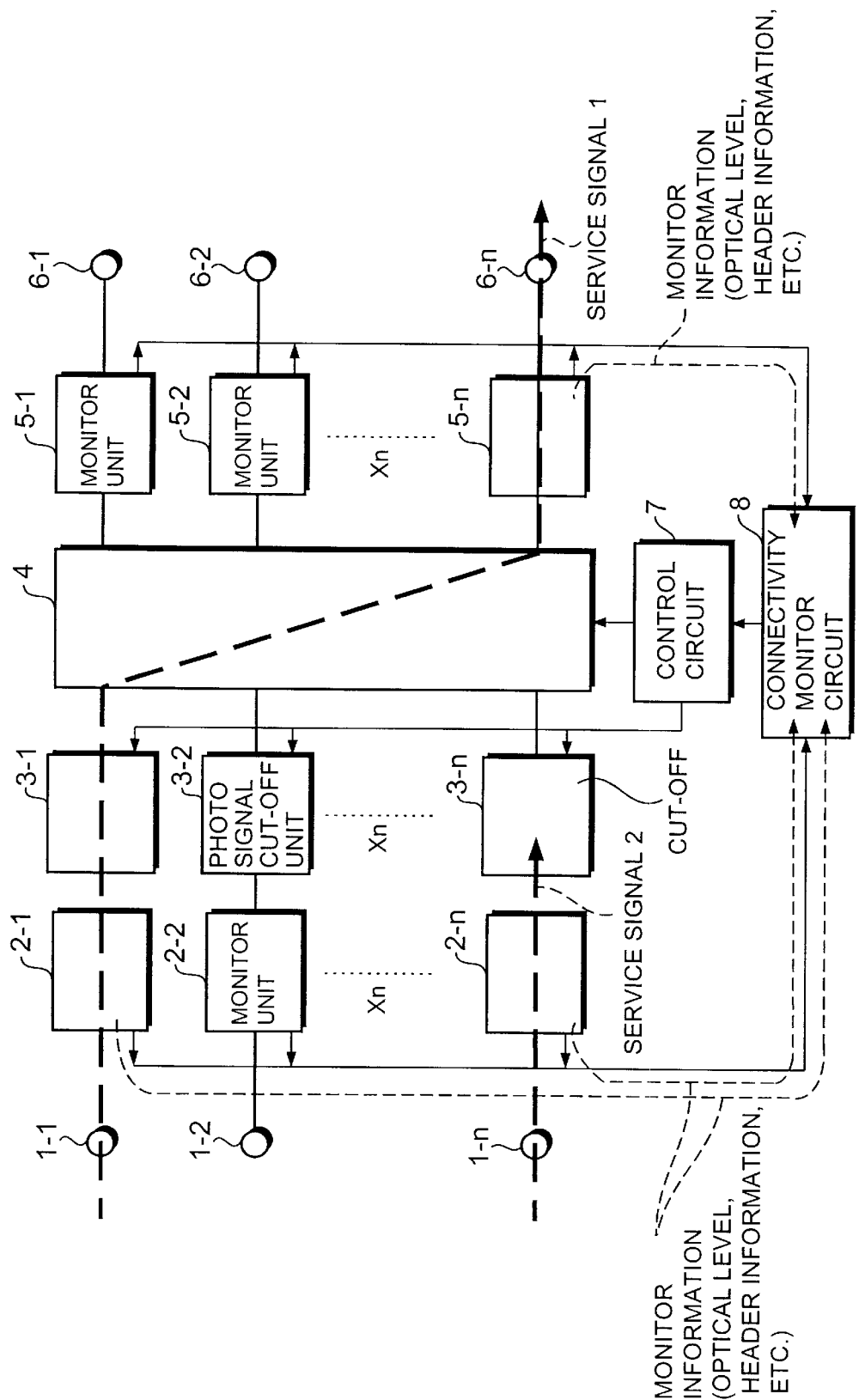
FIG. 7 is an explanatory diagram showing a state after switching over the optical path as well as showing the operation of the optical cross-connect in the first embodiment of the present invention.

FIGS. 5 through 7 are explanatory diagrams showing the operation of the optical cross-connect in the first embodiment of the present invention. FIG. 5 shows a state before switching over the optical path. FIG. 6 shows a bridge-connected state when in the switchover of the optical path. FIG. 7 shows a state after switching over the optical path.

Referring first to FIG. 5, supposing that the service signals 1, 2 are now inputted from, e.g., the input terminals 1-1 and 1-n, with the optical paths being set by the optical switch 4, the service signal 1 is outputted to the output terminal 6-2 (which serves as a "pre-switching photo signal output terminal" in this case), while the service signal 2 is outputted to the output terminal 6-n. At this time, pieces of monitor information (containing, e.g., optical levels and header information, etc.) on the service signals 1, 2 are transmitted to the connectivity monitor circuit 8, thereby confirming connection states anterior and posterior to the optical switch 4.

Hereupon, the service signal 1 is switched over to the output terminal 6-n (which serves as a "post-switching photo signal output terminal" in this case), and an operation of switching over the optical path in the case of cutting off the service signal 2, will be exemplified referring to FIG. 6.

To begin with, the photo signal cut-off unit 3-n cuts off the service signals 2 inputted to the input terminal 1-n, based on a control signal given from the control circuit 7. The optical switch 4 sets the optical path based on the control signal from the control circuit 7 so that the service signals 1 inputted to the input terminal 1-1 are outputted simultaneously to both of the output terminals 6-2 and 6-n. Herein, the state where the photo signals inputted from one single input terminal are connected simultaneously to the two output terminals, is termed a "bridge connection".

In the bridge-connected state as illustrated in FIG. 6, the monitor information on the service signal 1 is transmitted simultaneously from the monitor circuits 3-1 and 5-n, and hence the connectivity monitor circuit 8 is capable of confirming such a connectivity that the optical path extending from the input terminal 1-1 up to the output terminal 6-n is available as well as being effective.

FIG. 7 shows the state after switching over the optical path. The connectivity monitor circuit 8, after confirming that the path extending from the input terminal 1-1 up to the output terminal 6-n is connectable, transmits the signal to the optical path control circuit 7, and completely switches over the optical switch 4, thus completing the switchover of the optical path of the service signal 1.

Next, the n×n optical switch applied to the first embodiment and capable of the bridge connection described above, will be explained.

Figure 8:
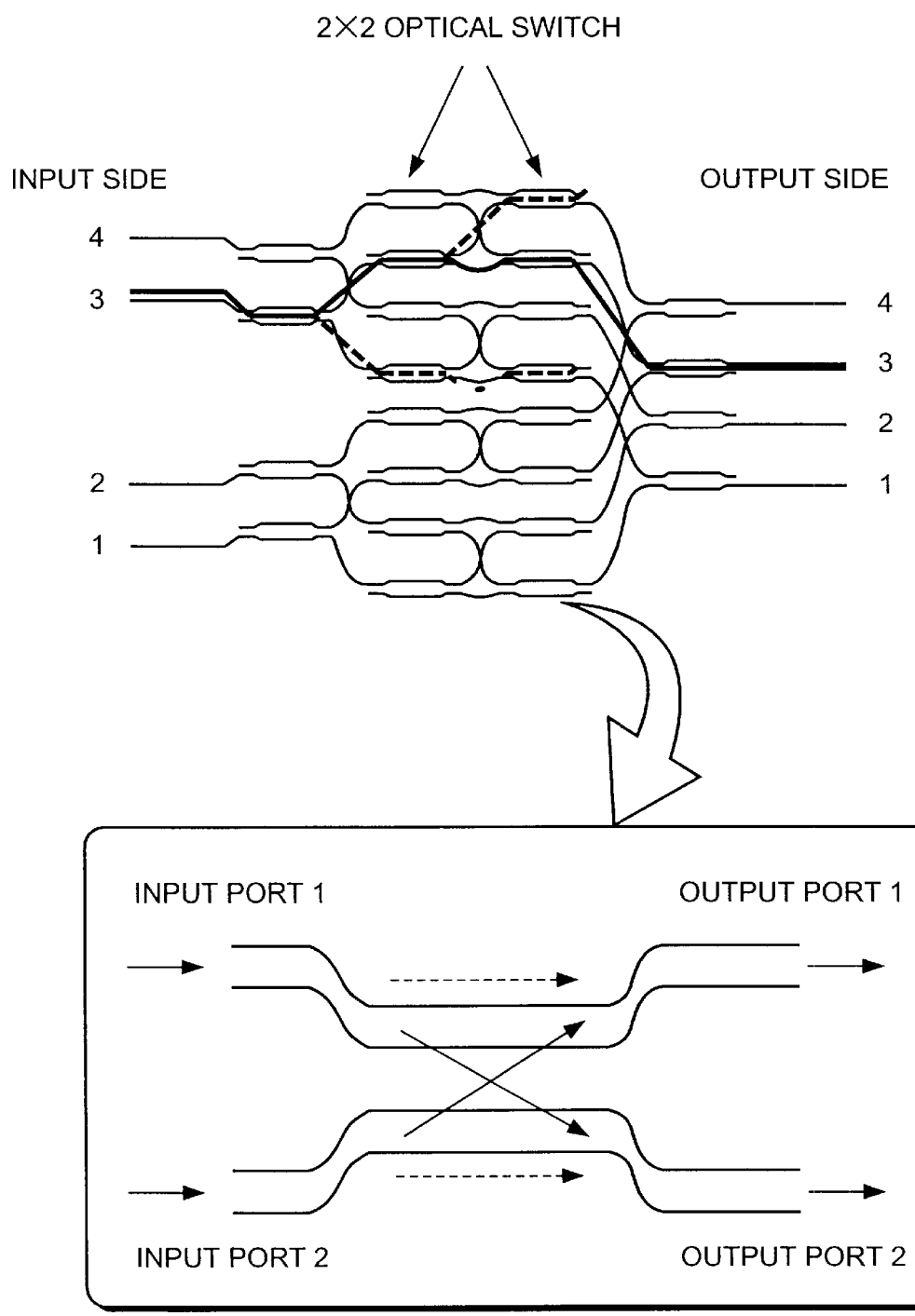
FIG. 8 is a diagram illustrating one example of a configuration of a 4×4 optical switch applied to the optical cross-connect of the present invention.

FIG. 8 is a diagram showing one example of a configuration of a 4×4 optical switch applied to the optical cross-connect of the present invention. The n×n optical switch used in the first embodiment is constructed in such a way that 2×2 optical switch elements formed on a substrate composed of such as $LiNbO_3$ (lithium niobate) and quartz series materials are connected in parallel at multi-stages. The 2×2 optical switch element is configured such that an optical wave guide is formed on the surface of the $LiNbO_3$ substrate, and an electrode is provided on an upper area thereof, whereby the optical path can be switched over between two I/O ports under control of how much a voltage is applied to the electrode.

What is shown in FIG. 8 exemplifies a construction in which the 4×4 optical matrix switch is constructed of the 2×2 optical switch elements described above. According to this construction, four pieces of 1×2 optical switches are disposed on each of input-and output-sides, and at the center the optical switches are connected in eight rows at two stages with this configuration, the photo signals inputted to the four ports on the input side, with the optical paths being switched over by a combination of the connection states of the respective 2×2 switch elements, can be outputted to the arbitrary four output-side ports, individually.

Figure 9:
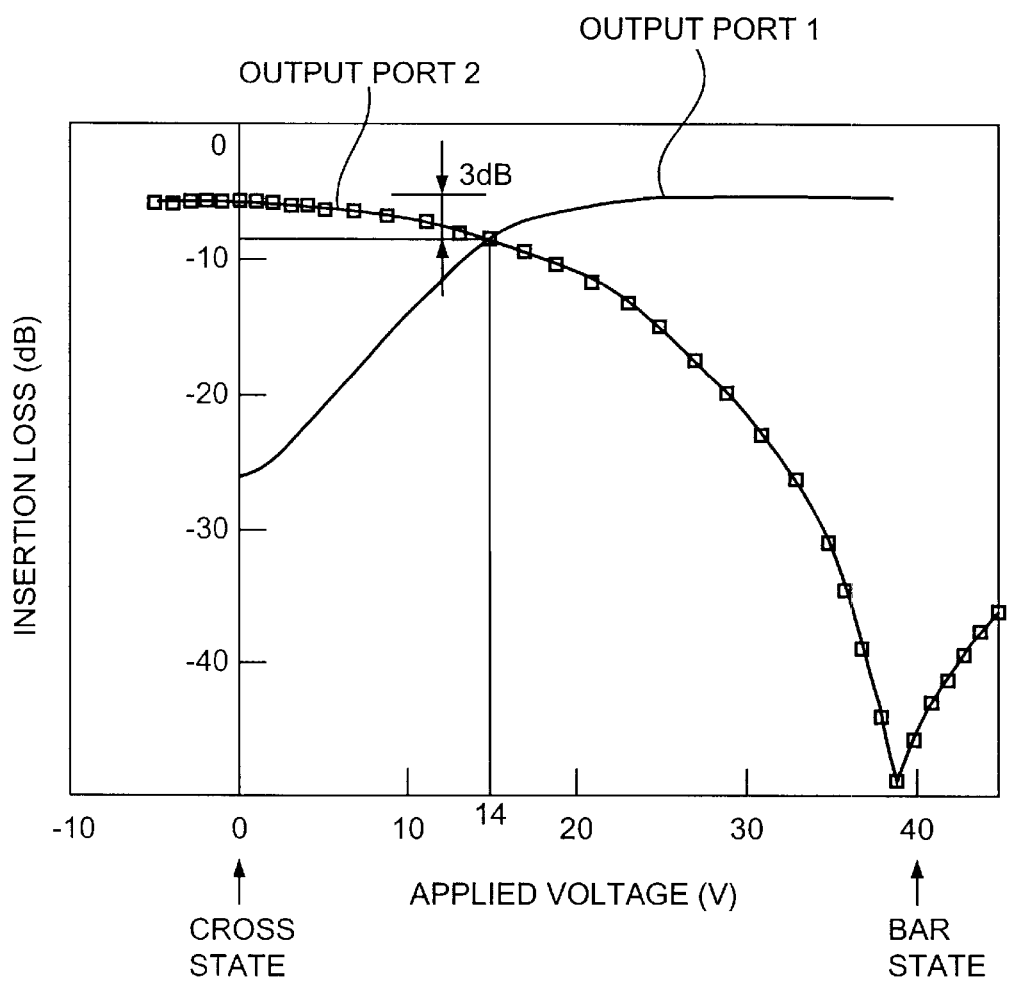
FIG. 9 is a switch characteristic diagram showing a relationship between an insertion loss and a voltage applied to a 2×2 optical switch defined as one element of the 4×4 optical switch shown in FIG. 8.

Herein, FIG. 9 shows one example of an optical switching characteristic determined based on a relationship between an optical output (or an insertion loss) and the voltage applied to the electrode of the 2×2 optical switch (or 1×2 optical switch) used for the 4×4 optical matrix switch described above. As can be understood from FIG. 9, the optical matrix switch performs the switching operation by applying the voltage to each of the 2×2 switch elements.

A relationship between the applied voltage and the switching state will be explained with reference to an enlarged view of the 2×2 optical switch indicated by arrowhead lines in FIG. 8. For example, a directional coupling unit with the optical wave-guides made proximal to each other so as to produce a mode coupling between the two optical wave-guides, is constructed in the $LiNbO_3$ optical wave-guide switch. This directional coupling unit is set to such a length that the light shifts completely to the other coupled optical wave-guide owing to the mode coupling in a state where no voltage is applied, i.e., to a complete coupling length. Referring again to FIG. 8, the light inputted from the input port 1 is outputted from the output port 2 in the voltage non-applied state (implying that the voltage is 0 in FIG. 9) (which may be called a cross state).

On the other hand, referring to FIG. 9, if a voltage in the vicinity of 40 V is applied, the light inputted from the input port 1 is outputted directly from the output port 1 (which may be called a bar state). Thus, the voltage to be applied is switched over between 0 V and 40 V, whereby the optical path can be switched over by setting the optical switching state to the cross state and the bar state, respectively.

In the optical cross-connect of the present invention, it is required for attaining the bridge connection described above in the above-mentioned optical switch that the light beams inputted from one single input port be outputted simultaneously from the two output ports. As comprehensive from FIG. 9, since an insertion loss to the output ports each other is 5 dB, the light beams outputted from the output ports 1, 2 are substantially equalized when reaching a position of an 8 dB insertion loss in which the output is reduced by 3 dB down to almost the half from the 5 dB position. This state can be obtained by setting the application voltage to approximately 14 V. It is determined by the output ports simultaneously connected which switch element among the plurality of 2×2 switch elements constituting the 4×4 optical switch should be set to the above simultaneous output state. Only the switch element thus determined is controlled in the simultaneous output state, and other switch elements may be controlled in the cross state or the bar state as usually done.

Note that the level of the photo signal is reduced down to the half in the bridge state, however, this reduced signal level is sufficient for monitoring the connectivity of the optical switch by detecting the photo signal in the monitor circuit disposed within the apparatus, as well as being temporary when in the switching process.

Figure 10:
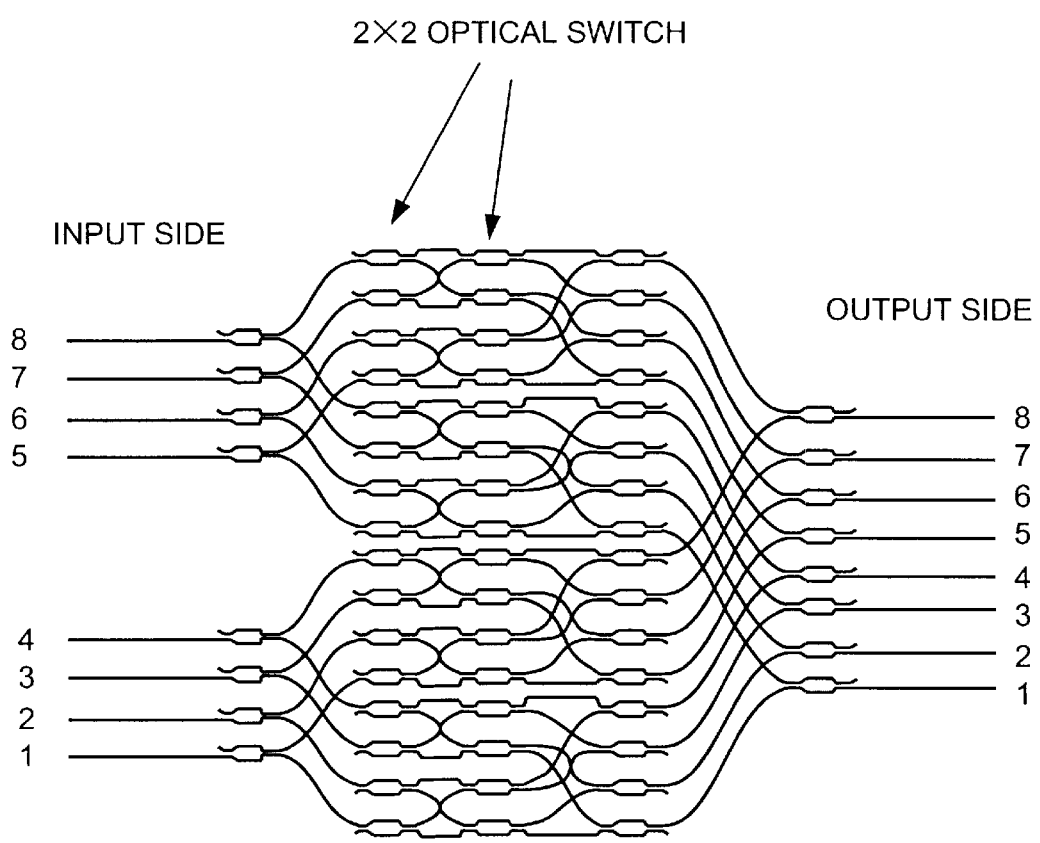
FIG. 10 is a diagram showing one example of a configuration of an 8×8 optical switch applied to the optical cross-connect of the present invention.
Figure 11:
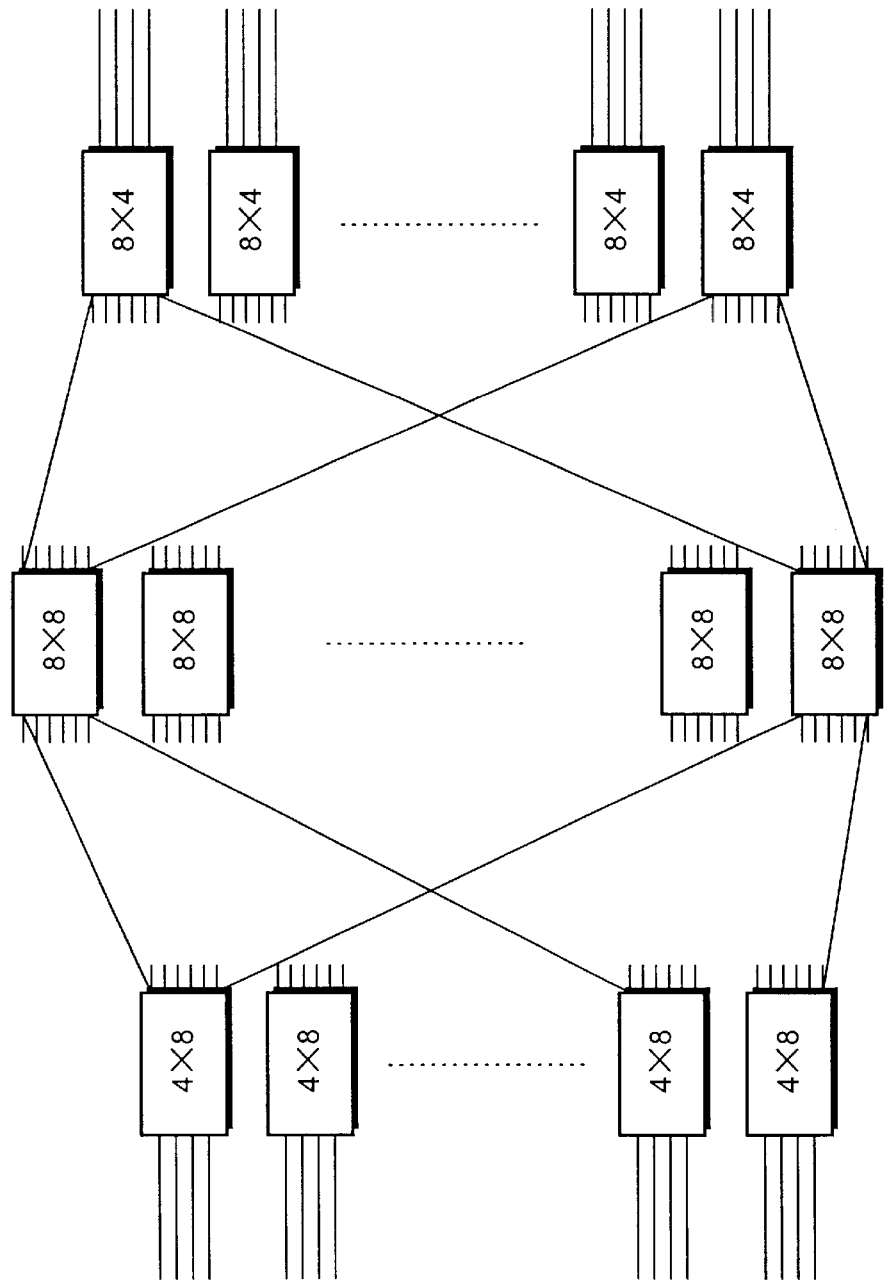
FIG. 11 is a diagram showing one example of a configuration of a 32×32 optical switch applied to the optical cross-connect of the present invention.

The 4×4 optical matrix switch has been described so far, however, if an 8×8 optical switch is applied to the optical cross-connect of the present invention, there can be considered the 8×8 optical switch having a construction illustrated in FIG. 10, and, in the case of a 32×32 optical switch, what is configured in FIG. 11 may also be considered as this type of optical switch. Even when thus scaled up, the principle and the operation for attaining the bridge connection are the same as those of the 4×4 optical switch.

Next, a configuration of the monitor circuit used in the first embodiment will be described. What is shown in, e.g., FIGS. 12 through 15 may be exemplified as a circuit for monitoring the photo signal inputted.

Figure 12:
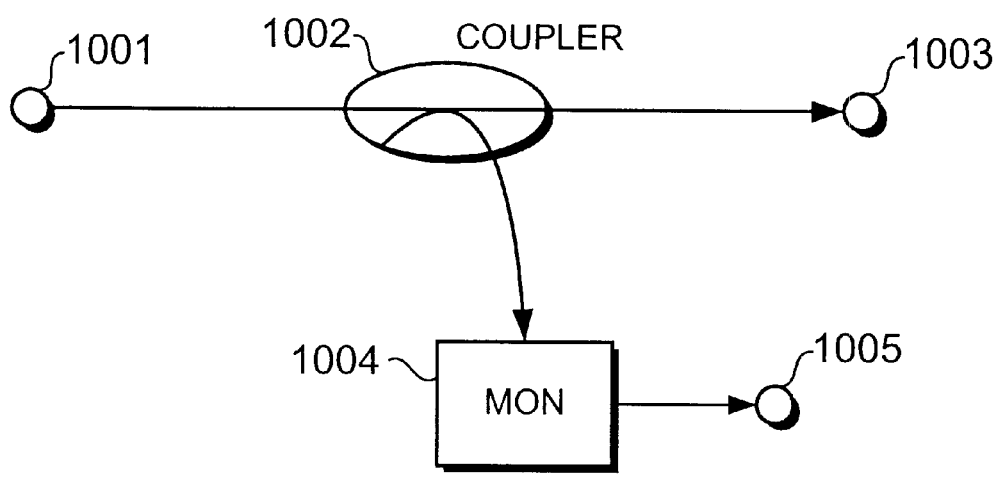
FIG. 12 is a diagram illustrating a construction using an optical splitter and a photoelectric converting element as well as showing one example of a monitor circuit used in the optical cross-connect in the first embodiment of the present invention.
Figure 13:
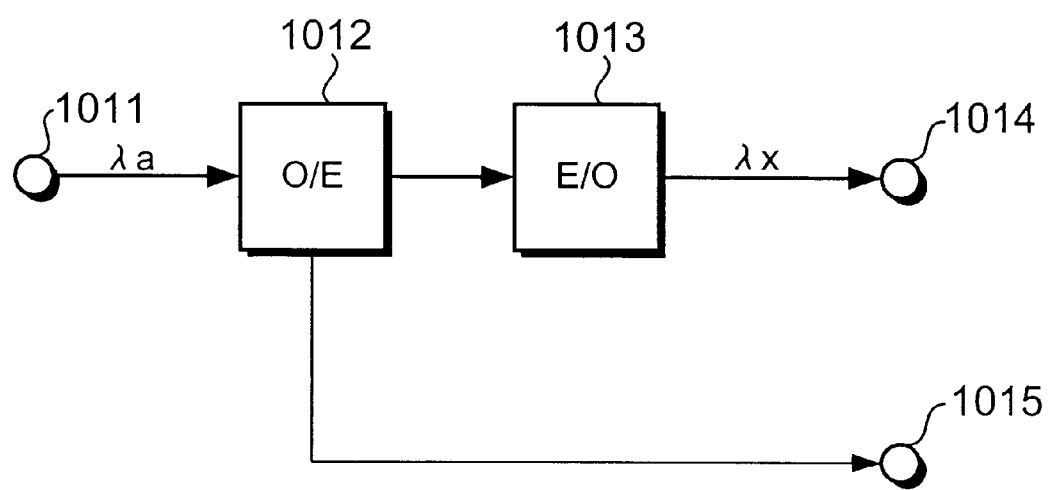
FIG. 13 is a diagram illustrating a construction using an optical regenerative function and an optical level monitor as well as showing one example of the monitor circuit used in the optical cross-connect in the first embodiment of the present invention.
Figure 14:
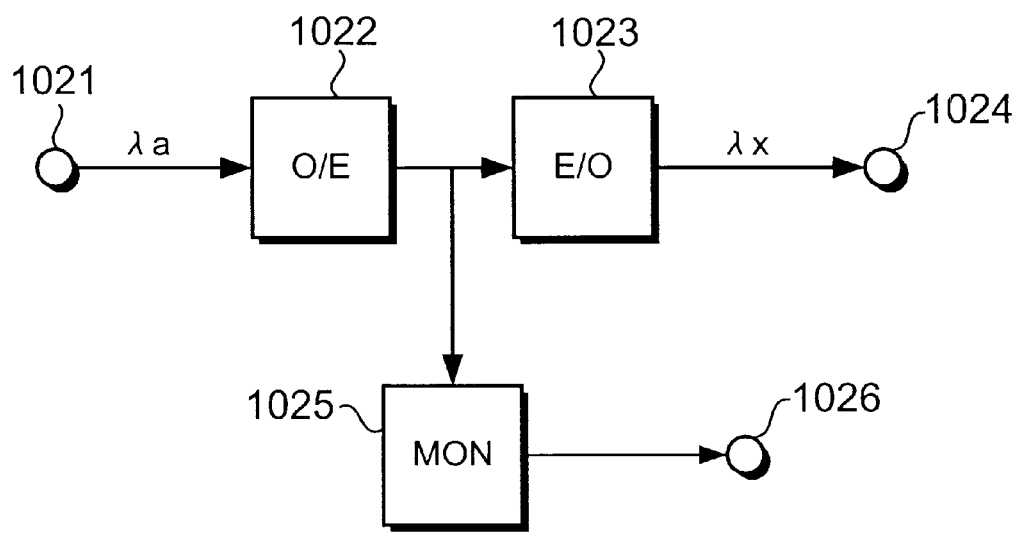
FIG. 14 is a diagram illustrating a construction using the optical regenerative function and an electric monitor function as well as showing one example of the monitor circuit used in the optical cross-connect in the first embodiment of the present invention.
Figure 15:
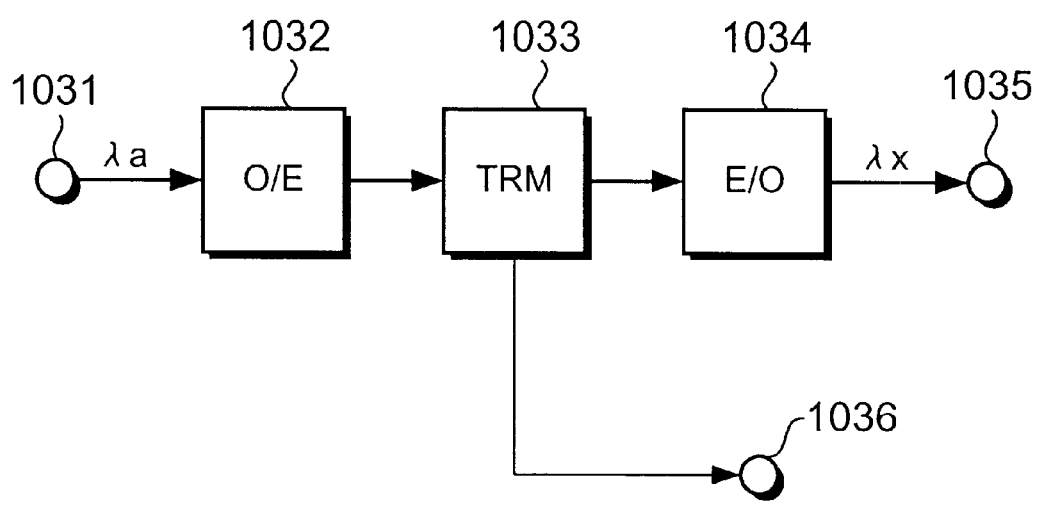
FIG. 15 is a diagram illustrating a construction using the optical regenerative function and a header terminating function as well as showing one example of the monitor circuit used in the optical cross-connect in the first embodiment of the present invention.

FIG. 12 shows one example of the monitor circuit used in the first embodiment of the optical cross-connect according to the present invention, wherein the circuit is configured by using an optical splitter and a photoelectric converting element. Similarly, FIG. 13 illustrates a configuration using an optical regenerative function and an optical level monitor. FIG. 14 shows a configuration using the optical regenerative function and an electric monitor function. FIG. 15 illustrates a configuration using the optical regenerative function and a header terminating function.

Throughout FIGS. 12–15, there are shown an optical input terminal 1001, an optical coupler 1002, an optical output terminal 1003, a photo signal monitor 1004, an optical monitor output terminal 1005, an optical input terminal 1011, a photoelectric converter 1012, an electro-optic converter 1013, an optical output terminal 1014, an optical level monitor output terminal 1015, an optical input terminal 1021, a photoelectric converter 1022, an electro-optic converter 1023, an optical output terminal 1024, an electric signal monitor 1025, an electric signal monitor output terminal 1026, an optical input terminal 1031, a photoelectric converter 1032, a header terminating circuit 1033, an electro-optic converter 1034, an optical output terminal 1035, and a header information output terminal 1036.

The construction shown in FIG. 12 involves the use of the optical splitter for splitting the photo signal inputted, and the optical level monitor incorporating the function of monitoring an optical level and a light wavelength thereof. This construction can be employed for monitoring whether or not a desired signal is inputted and outputted in front and rear of the optical switch. The construction shown in FIG. 13 has a function of temporarily converting the inputted photo signal into an electric signal and regenerating the photo signal. This construction is suitable for actualizing a node-to-node long-distance optical transmission-by enhancing an S/N ratio, and for converting the light wavelength ($\lambda a \rightarrow \lambda x$ in FIG. 13) between the I/O terminals. Herein, it is also possible to simultaneously monitor the level of the photo signal received. In the construction illustrated in FIG. 14, a function of monitoring the electric signal is added to the optical regenerative function, whereby it is feasible to monitor qualities as to a bit error and header information contained in the digital electric signals. Moreover, according to the construction shown in FIG. 15, a header terminating function is provided between the photoelectric converter and the electro-optic converter, whereby a state of quality and management information as a whole network can be monitored by terminating a section overhead in SDH (Synchronous Digital Hierarchy) and SONET (Synchronous Optical Network). In the above-described constructions for actualizing the monitor circuit, the functions can be selected corresponding to an architecture of the network and a category of the photo signal to be used.

Subsequently, a second embodiment of the optical cross-connect of the present invention will be discussed.

Figure 16:
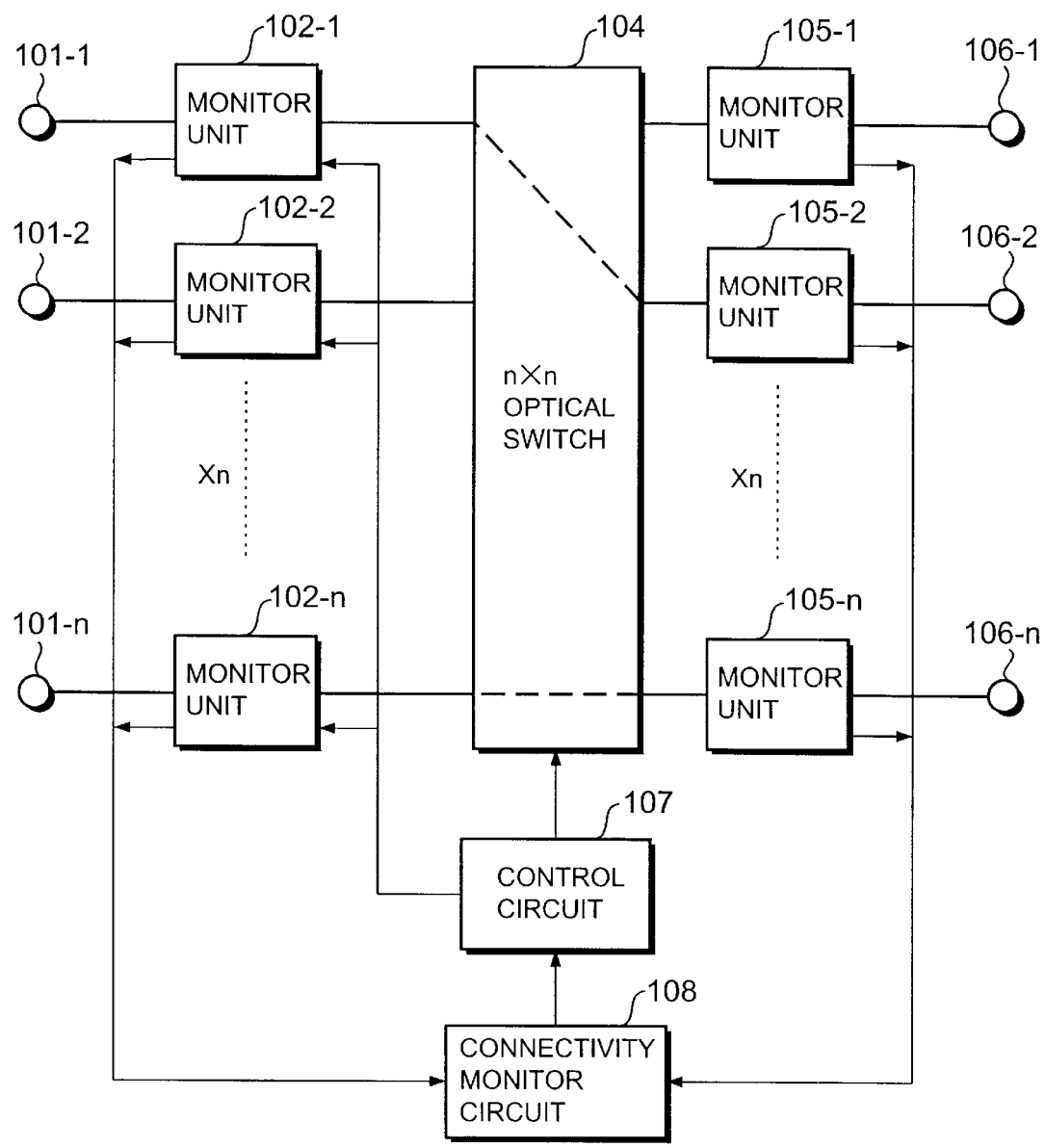
FIG. 16 is a diagram showing a construction of the optical cross-connect in a second embodiment of the present invention.

FIG. 16 is a diagram showing an architecture of the optical cross-connect in the second embodiment of the present invention. Referring to FIG. 16, there are illustrated photo signal input terminals 101-1~101-n, first monitor circuits 102-1~102-n, an n×n optical switch 104, second monitor circuits 105-1~105-n, photo signal output terminals 106-1~106-n, an optical path control circuit 107, and an connectivity monitoring circuit 108.

The architecture in the second embodiment is also basically the same as that in the first embodiment, however, the monitor circuit and the photo signal cut-off unit, which are disposed on the input-side in the first embodiment, are separately constructed. By contrast, however, a difference from the second embodiment is that the monitor circuit and the photo signal cut-off unit are united. Configurations shown in FIGS. 17 to 19 are characterized by adding a photo signal cut-off function to the optical regenerative function and the monitor function based on the constructions illustrated respectively in FIGS. 13 to 15 which have been described in the first embodiment.

Figure 17:
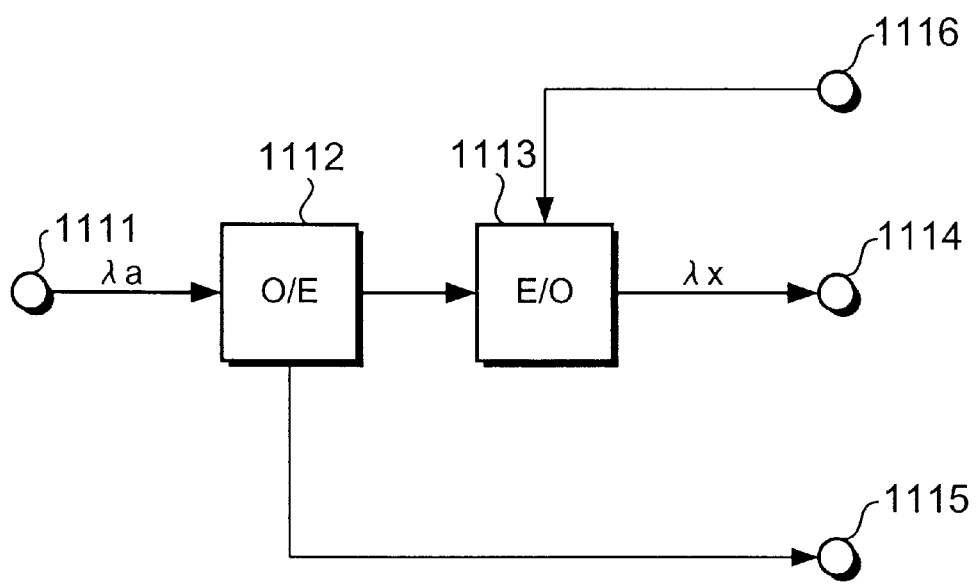
FIG. 17 is a diagram illustrating a construction using the optical regenerative function and the optical level monitor as well as showing one example of the monitor circuit used in the optical cross-connect in the second embodiment of the present invention.

To be specific, the configuration shown in FIG. 17 is one example of the monitor circuit used for the optical cross-connect in the second embodiment of the present invention, wherein the optical regenerative function and the optical level monitor function are employed. Similarly, FIG. 18 illustrates the configuration using the optical regenerative function and an electric monitor function. FIG. 19 shows the configuration using the optical regenerative function and the header terminating function.

Figure 18:
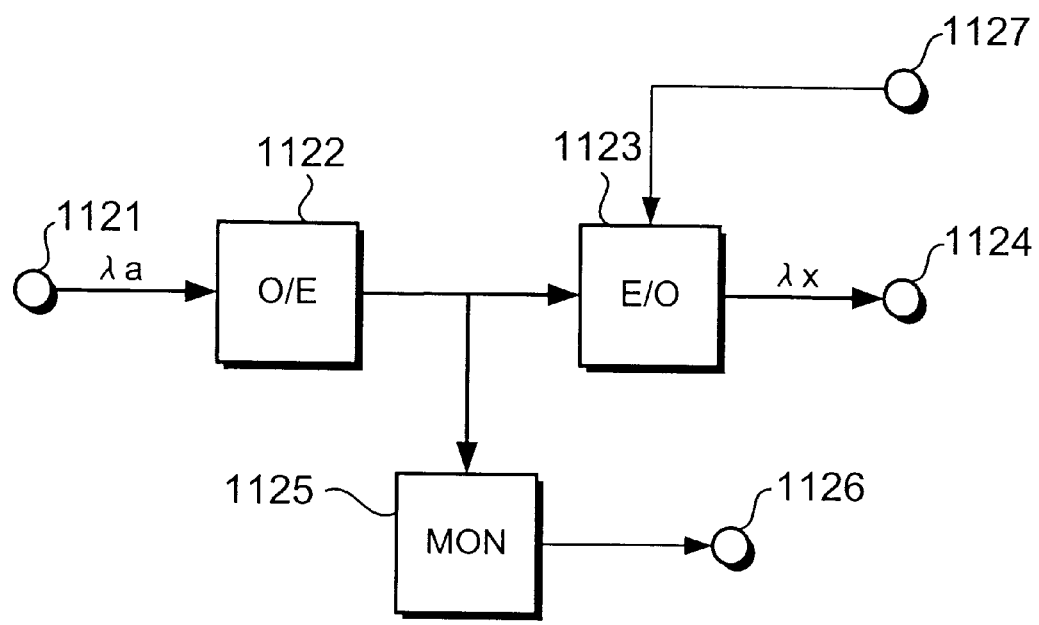
FIG. 18 is a diagram illustrating a construction using the optical regenerative function and the electric monitor function as well as showing one example of the monitor circuit used in the optical cross-connect in the second embodiment of the,present invention.
Figure 19:
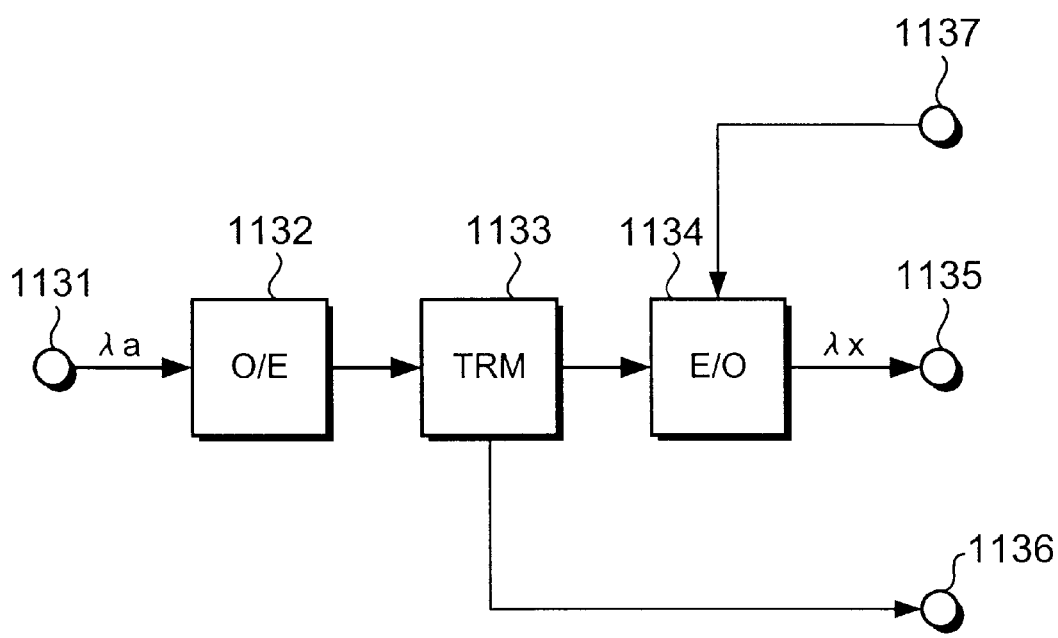
FIG. 19 is a diagram illustrating a construction using the optical regenerative function and the header terminating function as well as showing one example of the monitor circuit used in the optical cross-connect in the second embodiment of the present invention.

Throughout FIGS. 17–19, there are shown an optical input terminal 1111, a photoelectric converter 1112, an electro-optic converter 1113, an optical output terminal 1114, an optical level monitor output terminal 1115, a photo signal cut-off control input terminal 1116, an optical input terminal 1121, a photoelectric converter 1122, an electro-optic converter 1123, an optical output terminal 1124, an electric signal monitor 1125, an electric signal monitor output terminal 1126, a photo signal cut-off control input terminal 1127, an optical input terminal 1131, a photoelectric converter 1132, a header terminating circuit 1133, an electro-optic converter 1134, an optical output terminal 1135, a header information output terminal 1136, and a photo signal cut-off control input terminal 1137. Each of the configurations shown in FIGS. 17 through 19 is that the photo signal can be cut off by stopping the photo signal outputted from the electro-optic converter in accordance with a signal given from the photo signal cut-off control input terminal. Others are the same as those in the first embodiment.

Next, a third embodiment of the optical cross-connect according to the present invention will be explained.

Figure 20:
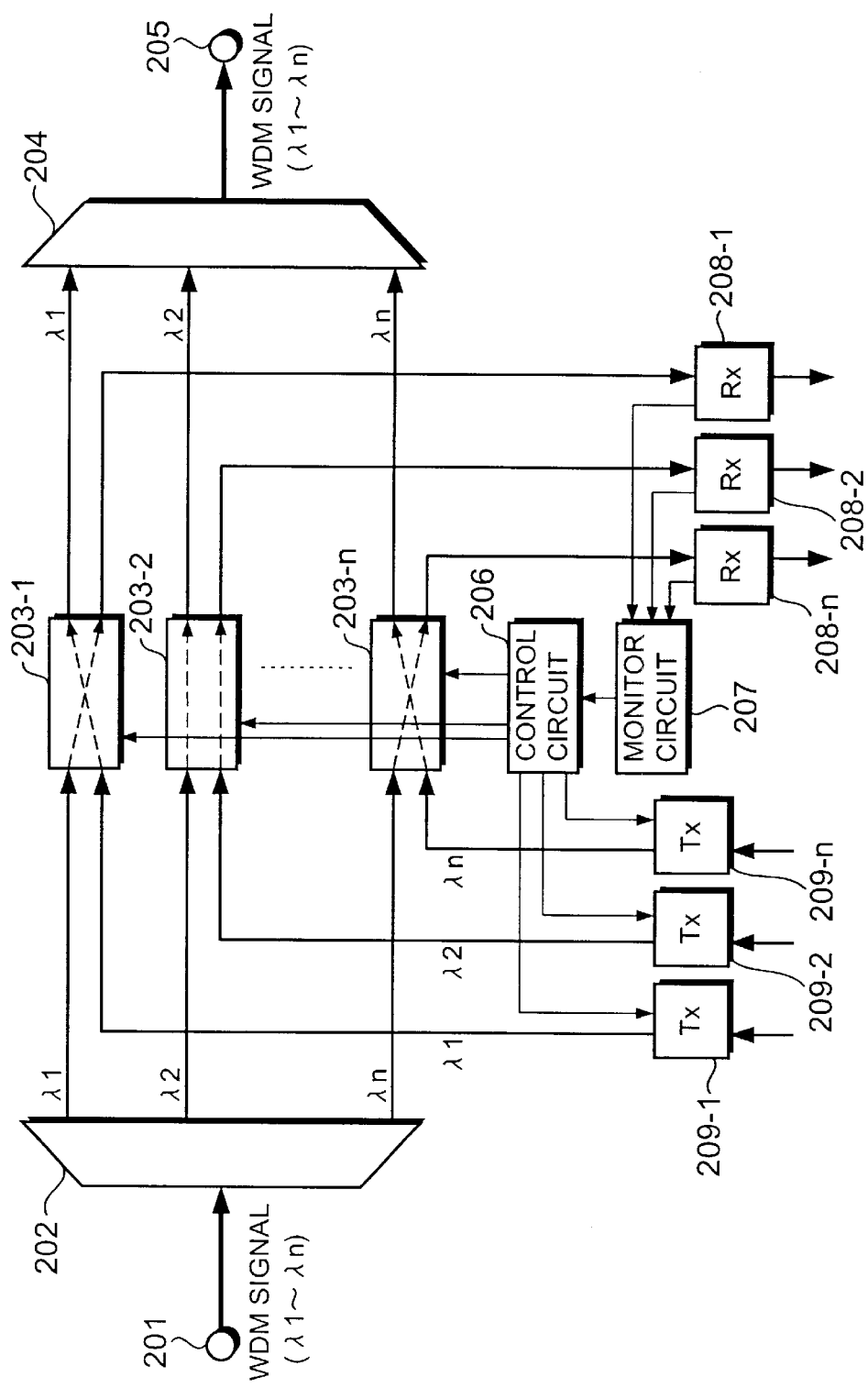
FIG. 20 is a diagram showing a construction of the optical cross-connect in a third embodiment of the present invention.

FIG. 20 shows an architecture of an optical ADM (Add/Drop Multiplexer) using the optical cross-connect by way of a construction of the third embodiment of the optical cross-connect of the present invention. Shown in FIG. 20 are a photo signal input terminal 201, an optical demultiplexer 202, a 2×2 optical switch 203, an optical coupler 204, a photo signal output terminal 205, an optical path control circuit 206, a connectivity monitor circuit 207, first monitor circuits 208-1~208-n, and second monitor circuits 209-1~209-n.

The third embodiment has such a characteristic that an ADM (Add/Drop Multiplexer) function based on the switchover of the optical path is applied to the optical transmission system utilizing WDM (Wavelength Division Multiplexing) technology.

Referring to FIG. 20, in a transmitting unit, the photo signals transmitted from n-pieces of optical transmission devices, of which wavelengths are converted by transmission light interfaces corresponding to wavelengths λ1~λn, and the transmission photo signal having a wavelength of n-wave is wavelength-division-multiplexed and transmitted to an optical fiber transmission path. On the other hand, in a receiving unit, the receiving photo signals are demultiplexed into the wavelengths λ1~λn, and respectively received by receiving light interfaces and the optical transmission devices. The n-wavelength photo signals having a large capacity are transmitted via one single optical fiber transmission path.

Herein, the photo signals inputted to a single optical path switching device from the optical demultiplexer 202, the photo signals outputted from optical transmitters 209-1, etc., the photo signals received by optical receivers 208-1, etc., and the photo signals outputted to the optical coupler 204, are defined as photo signals belonging to the same wavelength band. The photo signals outputted from the optical demultiplexer 202 and inputted to the optical path switching device 203, etc., have wavelengths different from each other.

In the optical ADM, the photo signals having the wavelengths λ1~λn are each demultiplexed from the wavelength division multiplexing signals (hereinafter abbreviated to "WDM signals") received via the transmission path, and the optical switch is capable of arbitrarily setting a wavelength which is dropped and added in the node thereof.

The optical path switching method in the optical cross-connect in the optical ADM using the optical cross-connect according to the third embodiment will be explained in somewhat greater details with reference to FIG. 20.

The WDM optical signals inputted to the input terminal 201 are demultiplexed into n-lines of photo signals having the wavelengths λ1~λn, and inputted respectively to n-pieces of 2×2 optical switches 203-1~203-n. In the optical switches 203-1~203-n, it is selectively set corresponding to a signal from the optical path control circuit 206 whether the photo signals having the respective wavelengths are transmitted to the optical receivers 208-1~208-n or to the WDM circuit 204. Simultaneously with this, in the optical transmitters 209-1~209-n, the photo signals transmitted from within the node are generated with particular wavelengths λ1~λn, and transmitted to the optical switches 203-1~203-n. The optical switches 203-1~203-n selectively set in accordance with the signal from the optical path control circuit 206 whether or not the photo signals from the optical transmitters 209-1~209-n are transmitted to the WDM circuit 204.

In the optical coupler, the photo signals from the optical switches 203-1~203-n are, after being wavelength-division-multiplexed, outputted to the photo signal output terminal 205. The optical receivers 208-1~208-n each have the monitor function.

Next, the photo signal switching operation in the third embodiment will be described referring to FIGS. 21 to 23.

Figure 21:
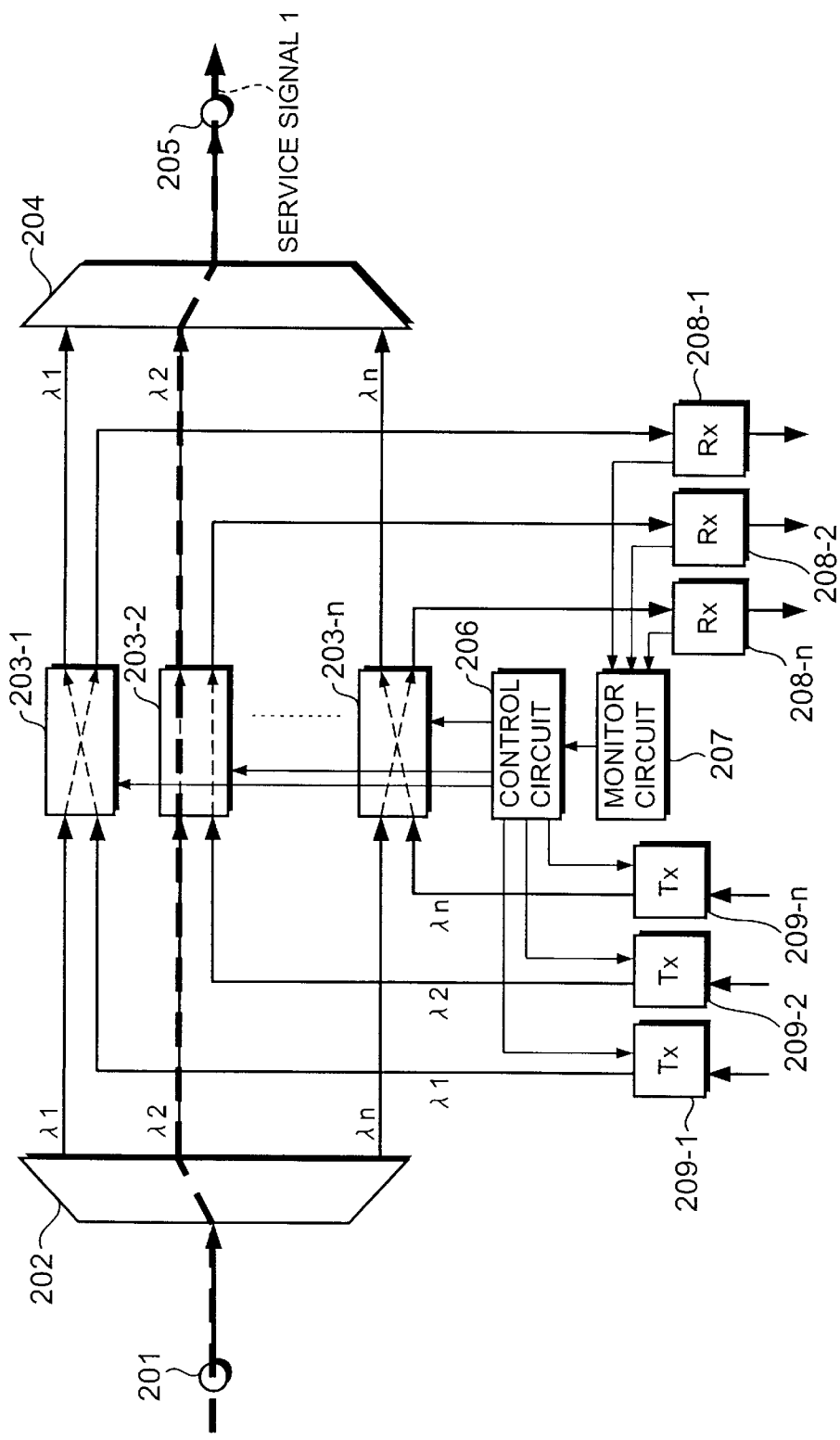
FIG. 21 is an explanatory diagram showing a state before switching over the optical path as well as showing an operation of the optical cross-connect in the third embodiment of the present invention.
Figure 22:
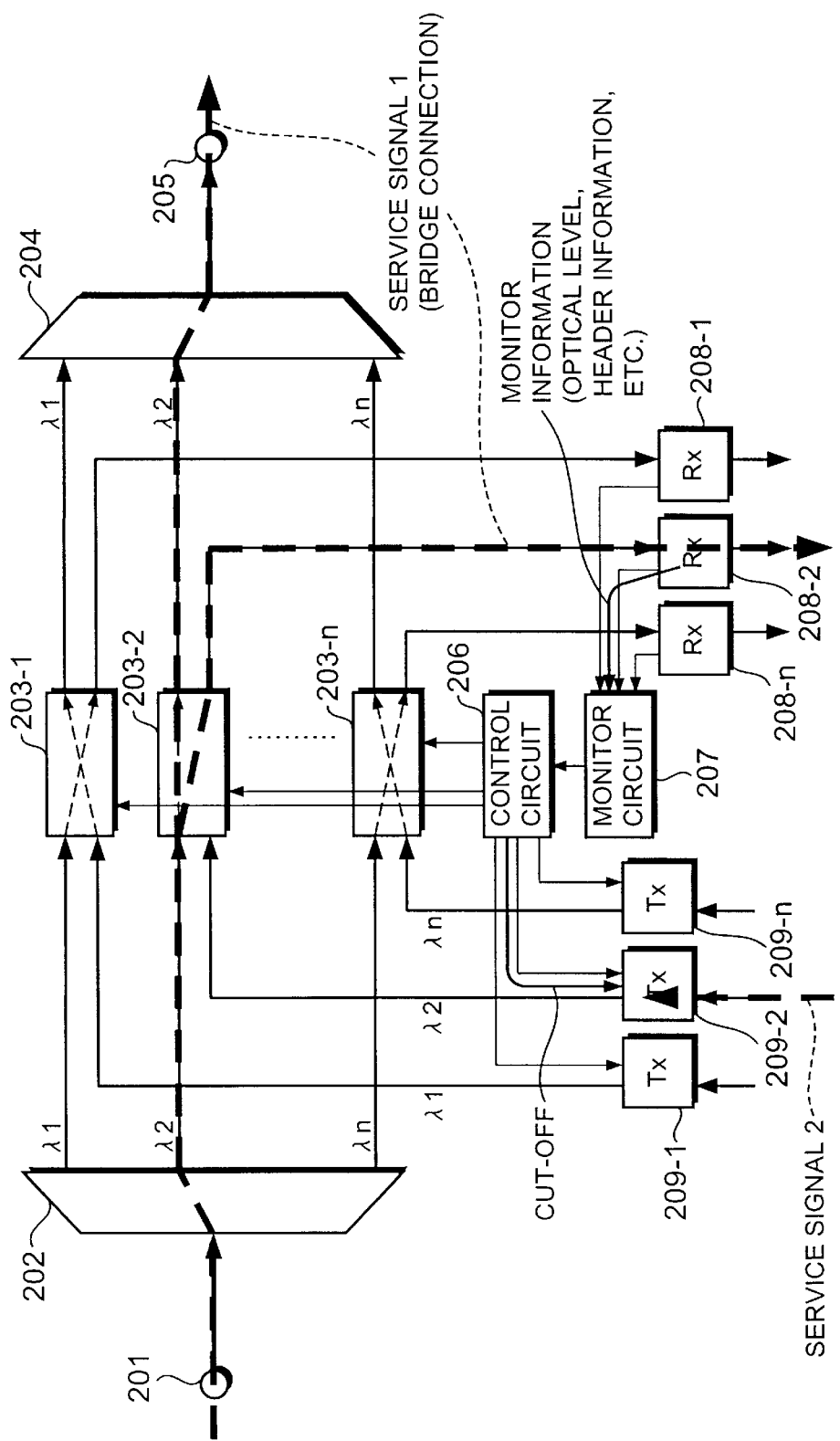
FIG. 22 is an explanatory diagram showing a bridge-connected state as well as showing the operation of the optical cross-connect in the third embodiment of the present invention.
Figure 23:
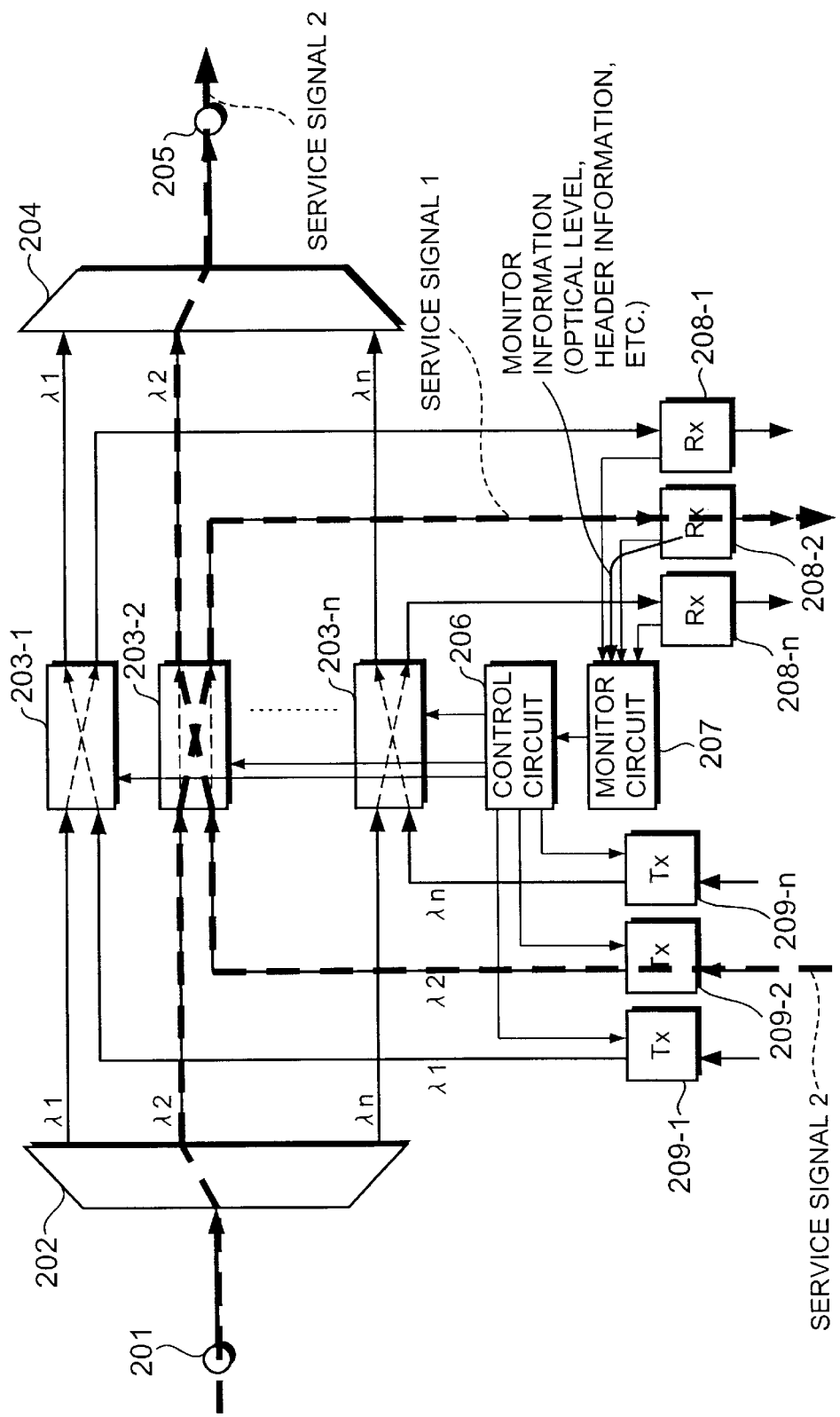
FIG. 23 is an explanatory diagram showing a state after switching over the optical path as well as showing the operation of the optical cross-connect in the third embodiment of the present invention.

FIGS. 21 to 23 are diagrams for explaining the operation of the optical cross-connect in the third embodiment of the present invention, and show a state before switching over the optical path, a bridge-connected state and a state after switching over the optical path, respectively.

Referring to FIG. 21, with the optical path being set by the optical switch 203-2, the photo signal having the wavelength λ2 (which is hereinafter called a "service signal 1" in the third embodiment) among the photo signals inputted to the input terminal 1, is inputted directly to the optical coupler 204. Herein, the photo signal is again wavelength-division-multiplexed, and thereafter outputted to the output terminal 205. The optical path, depicted by a bold line in FIG. 21, of the photo signal, indicates an initial state of switching over the optical path of the photo signal, which will be explained, hereinafter.

Given herein is an explanation about a case of switching over the optical path so that the service signal 1 is taken into the node via the optical receiver 208-2, and the photo signal coming from within the node (which is termed a "service signal 2" in the third embodiment) is outputted to the output terminal 205 via the optical transmitter 209-2.

Referring to FIG. 22, at the first onset, the photo signal cut-off unit 3-n cuts off the service signal 2 transmitted from within the node which has been inputted to the optical transmitter 209-2, based on the signal given from the control circuit 206. The optical switch 203-2, based on the signal from the control circuit 206, sets the optical path so that the service signals 1 are outputted simultaneously to both of the optical coupler 204 and the optical receiver 208-2, i.e., so that the bridge connection is established. In the state shown in FIG. 22, the optical receiver 208-2 detects the monitor information on the service signal 1 while the service signal 1 is kept in a state of being outputted to the optical coupler 204, the thus detected monitor information is sent to the connectivity monitor circuit 207. The connectivity monitor circuit 207 becomes capable of confirming such a connectivity that the service signal 1 can be received by the optical receiver 208-2 as well as being effective.

FIG. 23 shows a state after switching over the optical path. The connectivity monitor circuit 207 confirms that the service signal 1 is receivable. Thereafter, the signal is transmitted to the control circuit 206, and the optical switch 203-2 is completely switched over, thus completing the switchover of the route for the service signal 1. The photo signal cut-off state of the optical transmitter 209-2 is canceled, and the service signal 2 coming from within the node is outputted via the WDM circuit 204 to the output terminal 205. Note that the bridge connection and the complete switchover can be performed by the same control method using the same optical switch as those explained in the first embodiment.

Figure 24:
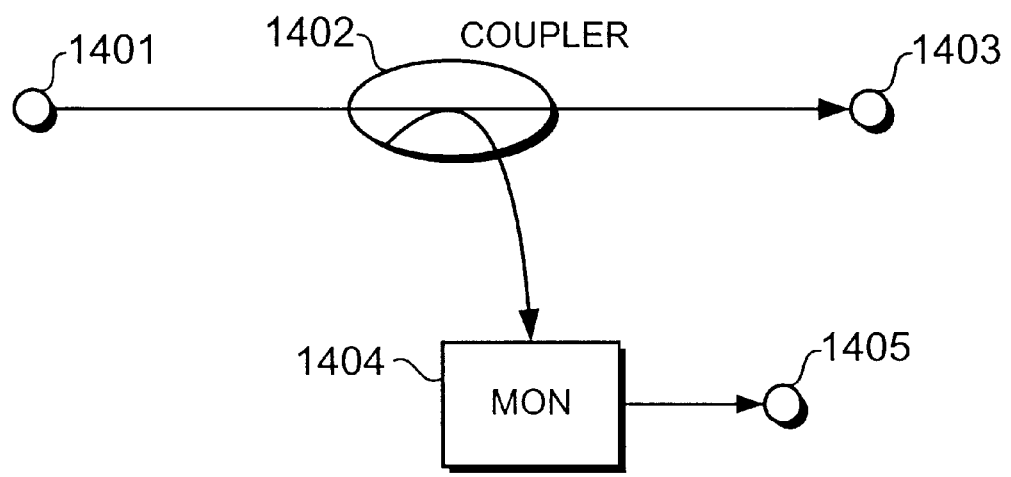
FIG. 24 is a diagram illustrating a construction using the optical splitter and the photoelectric converting element as well as showing one example of the monitor circuit used in the optical cross-connect in the third embodiment of the present invention.
Figure 25:
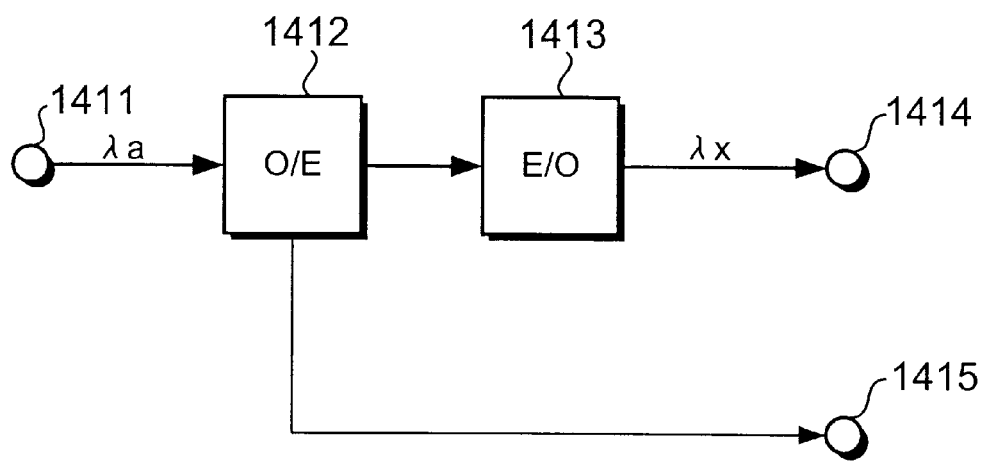
FIG. 25 is a diagram illustrating a construction using the optical regenerative function and the optical level monitor as well as showing one example of the monitor circuit used in the optical cross-connect in the third embodiment of the present invention.
Figure 26:
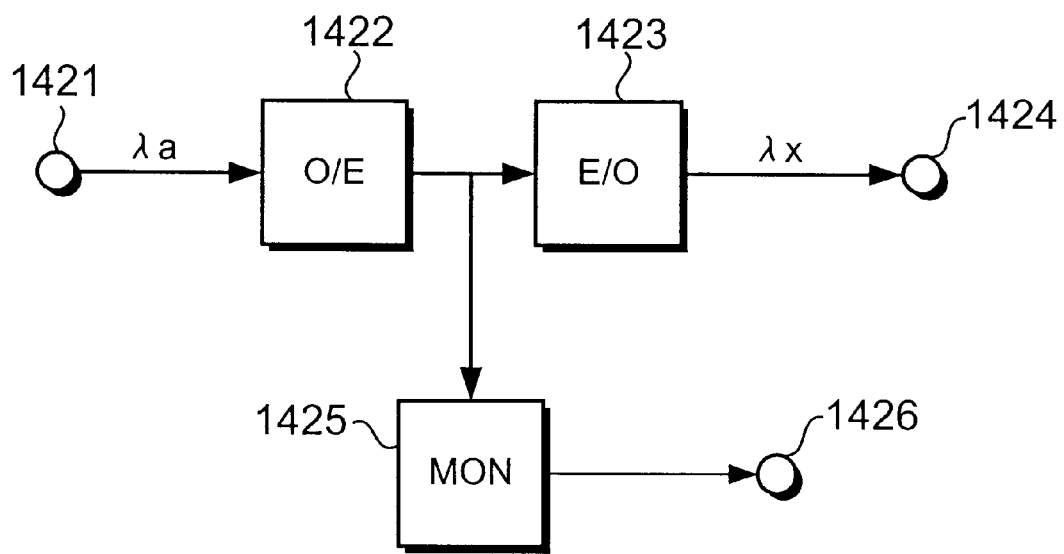
FIG. 26 is a diagram illustrating a construction using the optical regenerative function and the electric monitor function as well as showing one example of the monitor circuit used in the optical cross-connect in the third embodiment of the present invention.
Figure 27:
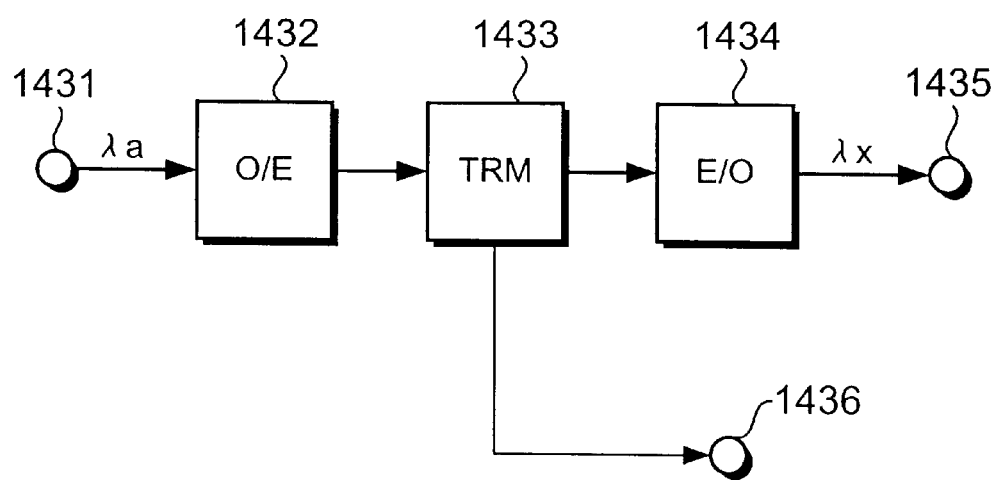
FIG. 27 is a diagram illustrating a construction using the optical regenerative function and the header terminating function as well as showing one example of the monitor circuit used in the optical cross-connect in the third embodiment of the present invention.

Herein, the construction of the monitor circuit used in the third embodiment will be described. FIG. 24 shows one example of the monitor circuit used in the third embodiment of the optical cross-connect according to the present invention, wherein the construction thereof involves the use of the optical splitter and the photoelectric converting element. FIG. 25 illustrates a construction using the optical regenerative function and the optical level monitor. FIG. 26 shows a construction using the optical regenerative function and the electric monitor function. FIG. 27 illustrates a construction employing the optical regenerative function and the header terminating function.

Throughout FIGS. 24–27, there are shown an optical input terminal 1401, an optical coupler 1402, an optical output terminal 1403, a photo signal monitor 1404, an optical monitor output terminal 1405, an optical input terminal 1411, a photoelectric converter 1412, an electro-optic converter 1413, an optical output terminal 1414, an-optical level monitor output terminal 1415, an optical input terminal 1421, a photoelectric converter 1422, an electro-optic converter 1423, an optical output terminal 1424, an electric signal monitor 1425, an electric signal monitor output terminal 1426, an optical input terminal 1431, a photoelectric converter 1432, a header terminating circuit 1433, an electro-optic converter 1434, an optical output terminal 1435, and a header information output terminal 1436.

The construction of the monitor circuit shown in FIG. 24 has a function of splitting the photo signal inputted and monitoring an optical level and a light wavelength. This construction can be employed for monitoring whether or not a desired signal is inputted and outputted in front and rear of the optical switch. The construction shown in FIG. 25 has a function of temporarily converting the inputted photo signal into an electric signal and regenerating the photo signal, and is applied to cases actualizing a node-to-node long-distance optical transmission by enhancing an S/N ratio, and converting the light wavelength ($\lambda a \rightarrow \lambda x$ in FIG. 25) between the I/O terminals. Herein, the level of the photo signal received is also monitored simultaneously.

In the construction illustrated in FIG. 26, a function of monitoring the electric signal is added to the optical regenerative function, whereby it is feasible to monitor qualities as to a bit error and header information contained in the digital electric signals. According to the construction shown in FIG. 27, the header terminating function is provided between the photoelectric converter and the electro-optic converter, whereby a state of quality and management information as a whole network can be monitored by terminating the section overhead in SDH (Synchronous Digital Hierarchy) and SONET (Synchronous Optical Network). The optical receiver used in the above-described constructions is capable of selecting the function corresponding to an architecture of the network and a category of the photo signal to be used.

Figure 28:
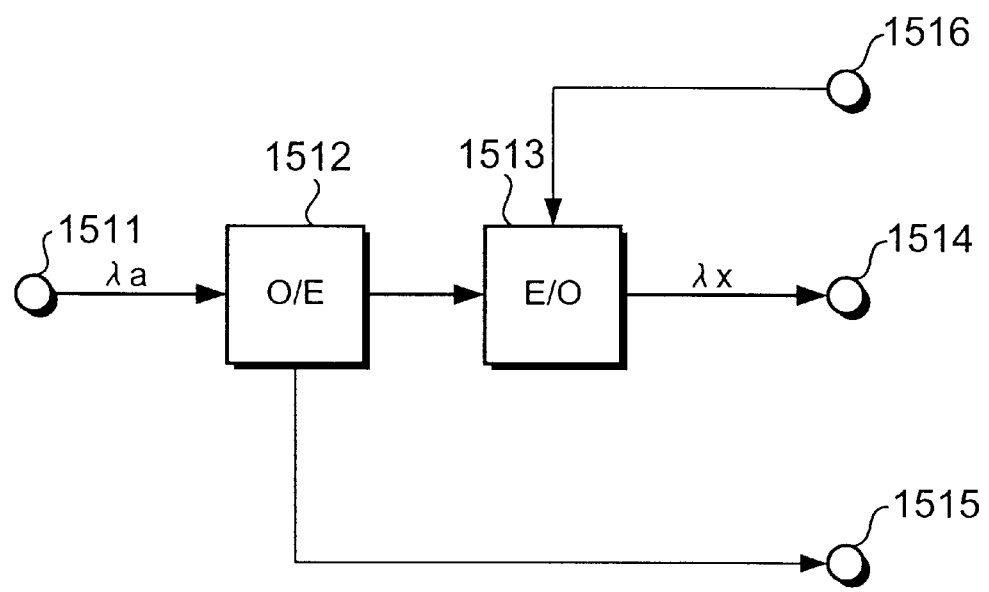
FIG. 28 is a diagram illustrating a construction using the optical regenerative function and the optical level monitor as well as showing one example of an optical transmission unit used in the optical cross-connect in the third embodiment of the present invention.
Figure 29:
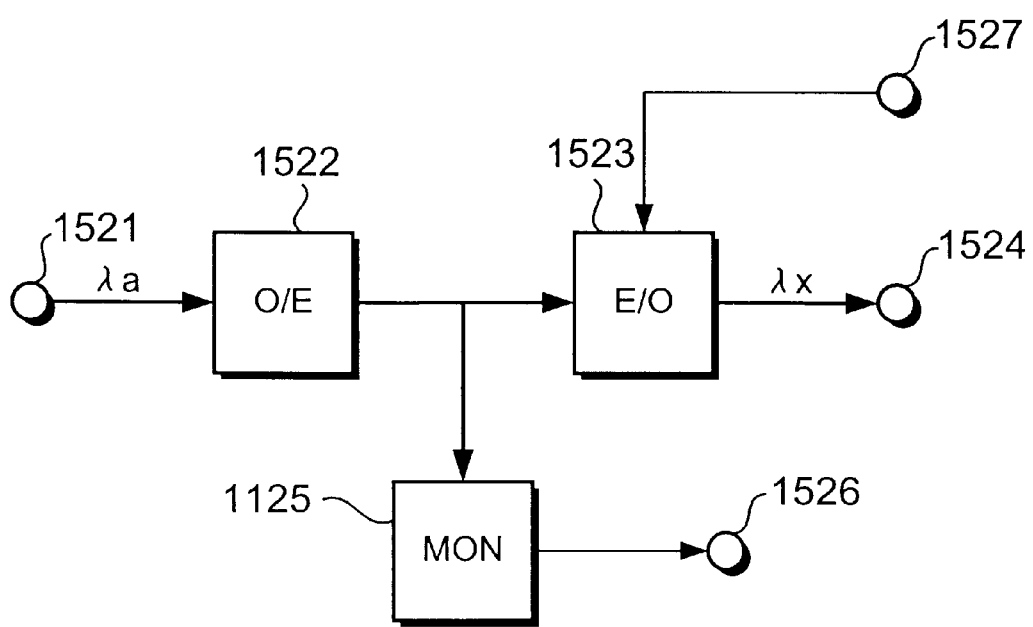
FIG. 29 is a diagram illustrating a construction using the optical regenerative function and the electric monitor function as well as showing one example of the optical transmission unit used in the optical cross-connect in the third embodiment of the present invention.
Figure 30:
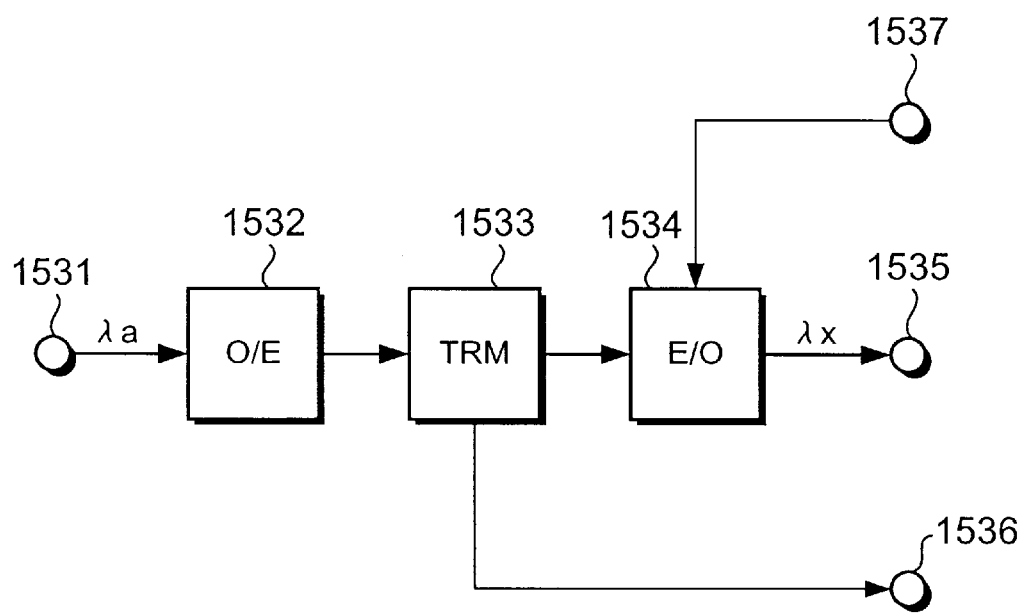
FIG. 30 is a diagram illustrating a construction using the optical regenerative function and the header terminating function as well as showing one example of the optical transmission unit used in the optical cross-connect in the third embodiment of the present invention.

Next, configurations of the optical transmitters 209-1~209-n are explained. The optical transmitters 209-1~209-n used herein have the photo signal cut-off function. FIGS. 28 through 30 illustrate examples of the configuration thereof.

FIG. 28 shows the configuration using the optical regenerative function and the optical level monitor. FIG. 29 shows the configuration using the optical regenerative function and the electric monitor function. FIG. 30 shows the optical regenerative function and the header terminating function.

Throughout FIGS. 28–30, there are shown an optical input terminal 1511, a photoelectric converter 1512, an electro-optic converter 1513, an optical output terminal 1514, an optical level monitor output terminal 1515, a photo signal cut-off control input terminal 1516, an optical input terminal 1521, a photoelectric converter 1522, an electro-optic converter 1523, an optical output terminal 1524, an electric signal monitor 1525, an electric signal monitor output terminal 1526, a photo signal cut-off control input terminal 1527, an optical input terminal 1531, a photoelectric converter 1532, a header terminating circuit 1533, an electro-optic converter 1534, an optical output terminal 1535, a header information output terminal 1536, and a photo signal cut-off control input terminal 1537.

Each of the constructions illustrated in FIGS. 28 through 30 incorporates the photo signal cut-off function in addition to the optical regenerative function and the monitor function which are illustrated in FIGS. 25 to 27. In the constructions illustrated in FIGS. 18 through 30, the photo signal is cut off by stopping the photo signal outputted from the electro-optic converter in accordance with the signal coming from the photo signal cut-off control input terminal.

Figure 31:
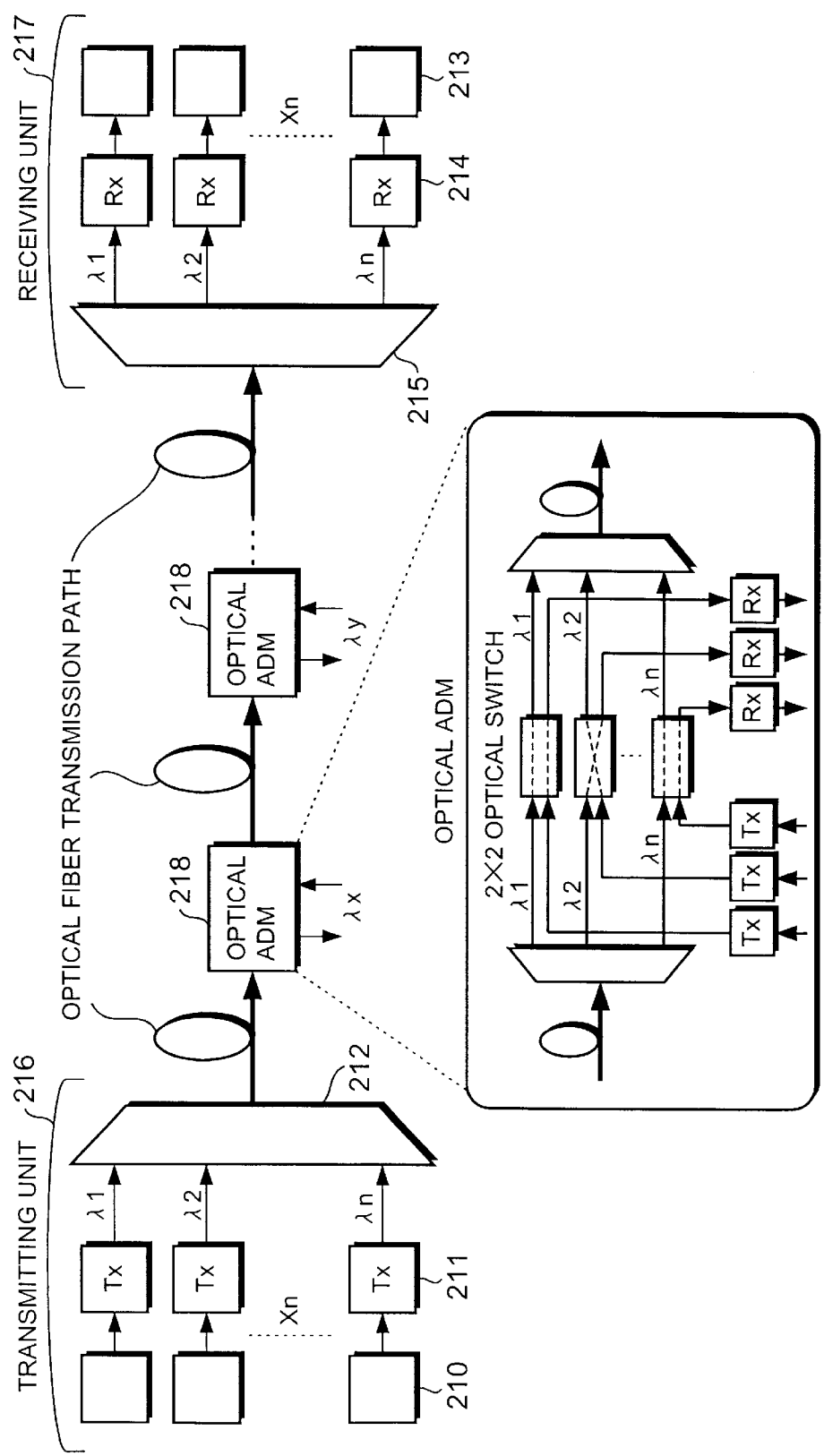
FIG. 31 is a diagram showing an architecture of a whole optical transmission device incorporating an optical ADM function, to which the optical cross-connect exemplified in the third embodiment of the present invention is applied.

The third embodiment of the optical cross-connect of the present invention which has been discussed so far is, it can be considered, applied to the optical transmission system including the optical ADM as shown in FIG. 31. To be specific, the third embodiment can be applied to the optical transmission system constructed of a transmitting-side terminal node 216 including optical transmitters 210 for transmitting plural lines of photo signals (constituting the service signals) having wavelengths different from each other, transmission interfaces 211 corresponding thereto and an optical coupler 212 for coupling the photo signals therefrom, a receiving-side terminal node 217 including an optical demultiplexer 215 for demultiplexing the transmitted WDM photo signals, receiving interfaces 214 for receiving the photo signals with the demultiplexed wavelengths and an optical receiver 213, and optical ADMs 218 disposed between the terminal nodes 216 and 217.

In the optical ADM applied to the thus constructed optical transmission system, before completely switching over the route for the photo signals, the input of the optical switch is connected simultaneously (bridge-connected) to the plurality of outputs, then it is confirmed that the signals can be received via the changed route and are classified as service signals, and, after the connectivity has been confirmed, the optical path is completely switched over. It is therefore feasible to grasp, before performing the switchover, a connection, a category and a state of quality of the service signal on the changed optical path, thereby obtaining such an effect that the cut-off of the service signal due to the mis-setting and a failure in the system can be avoided.

Next, a fourth embodiment of the optical cross-connect according to the present invention will be discussed.

Figure 32:
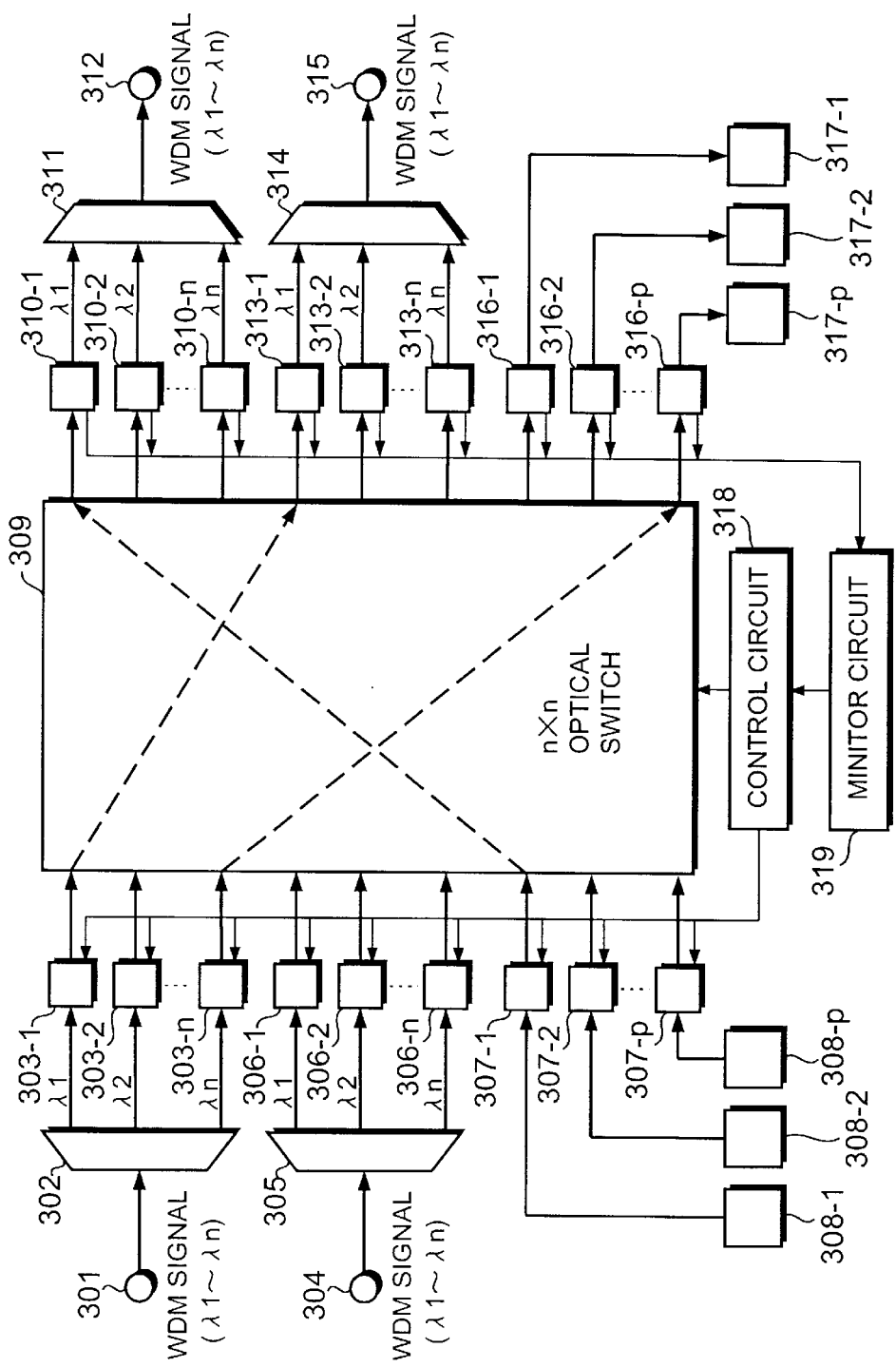
FIG. 32 is a diagram showing a construction of the optical cross-connect in a fourth embodiment of the present invention.

FIG. 32 is a diagram showing a configuration of the optical cross-connect in the fourth embodiment of the present invention as well as showing a configuration of the nodes in the optical cross-connect network system. Referring to FIG. 32, there are shown optical input terminal 301, an optical demultiplexer 302, optical transmitters 303-1~303-n, an optical input terminal 304, an optical demultiplexer 305, optical transmitters 306-1~306-n, optical transmitters 307-1~307-p, optical transmission devices 308-1~308-p, an m×m optical switch 309, optical receivers 310-1~310-n, an optical coupler 311, a photo signal output terminal 312, optical receivers 313-1~313-n, an optical coupler 314, a photo signal output terminal 315, optical receivers 316-1~316-p, optical transmission devices 317-1~317-p, an optical path control circuit 318, and a connectivity monitor circuit 319.

The photo signals transmitted from other nodes, of which the wavelength 1 in have been multiplexed, are inputted to the optical input terminals 301, 304. Then, the photo signals are, after being demultiplexed into the wavelengths 1 in by the optical demultiplexers 302 and 305, inputted to the m×m optical switch 309 via the optical transmitters 303-1~303-n and 306-1~306-n.

Within the node, the photo signals are outputted from the optical transmission devices 308-1~308-p. These p-lines of photo signals are inputted to the m×m optical matrix switch 309 via the optical transmitters 307-1~307-p.

The photo signals outputted from (2×n) ports among m-pieces of ports ("m" in the fourth embodiment is given by: m=(2×n) +p) of the m×m optical switch 309, whose wavelengths are multiplexed by the optical couplers 311, 314, are transmitted via the optical receivers 310-1~310-n, 313-1~313-n toward other nodes from the output terminals 312, 315. The photo signals outputted from p-pieces of remaining ports of the optical switch 309 are inputted via the optical receivers 316-1~316-p to the optical transmission devices 317-1~317-p.

The optical switch 309 arbitrarily selectively connects the m-pieces input ports to the m-pieces of output ports in accordance with a signal given from the optical path control circuit 318, thus outputting the signals.

The above-described optical transmitters and optical receivers have the same functions and the same configurations as those of the monitor circuits shown in FIGS. 24 to 27 and of the optical transmitters shown in FIGS. 28 to 30. The functions of these optical transmitters and optical receivers may be selected or removed corresponding to the network architecture and the categories of the photo signals to be used.

Next, the operation of the optical cross-connect in the optical cross-connect network system in the fourth embodiment will be described.

Figure 33:
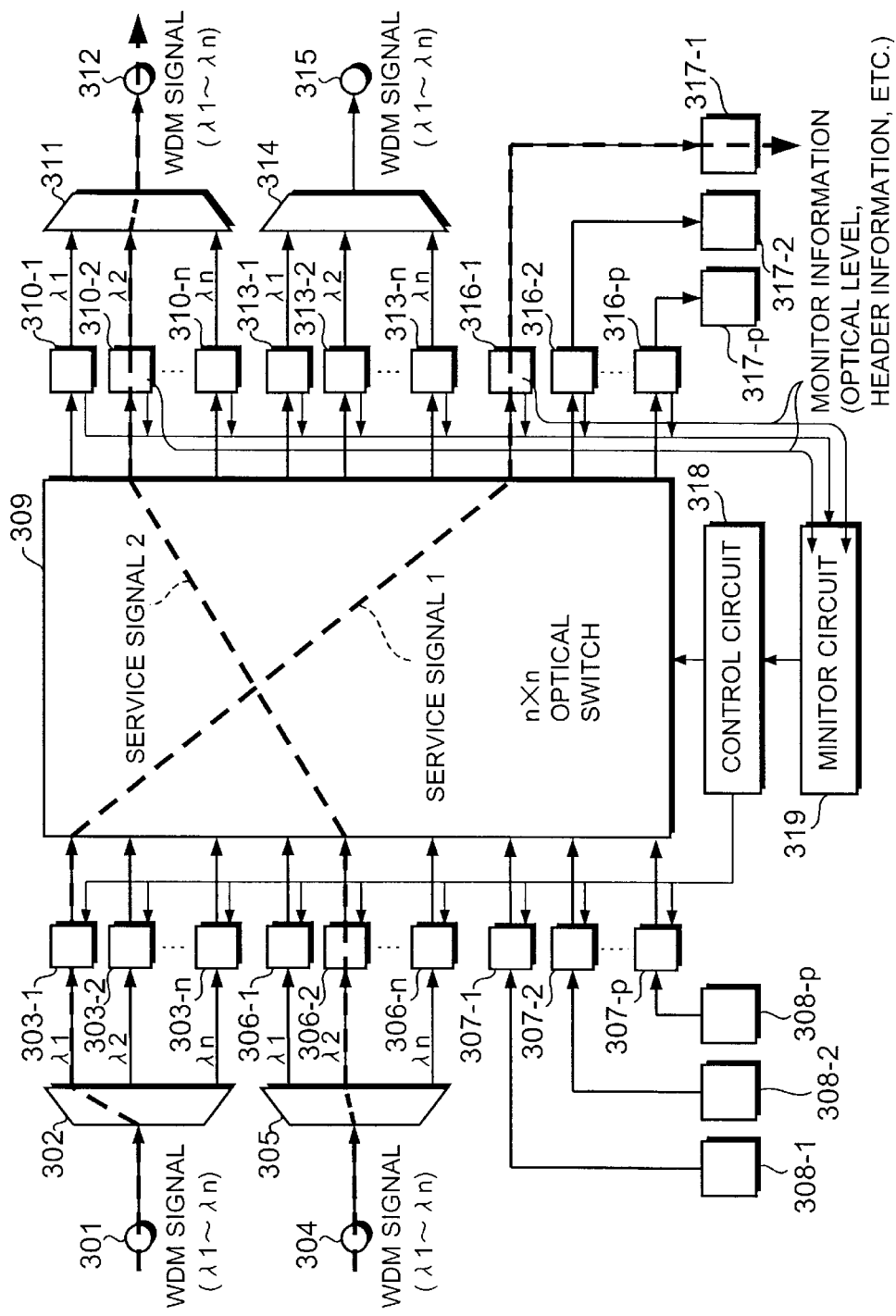
FIG. 33 is an explanatory diagram showing a state before switching over the optical path as well as showing an operation of the optical cross-connect in the fourth embodiment of the present invention.
Figure 34:
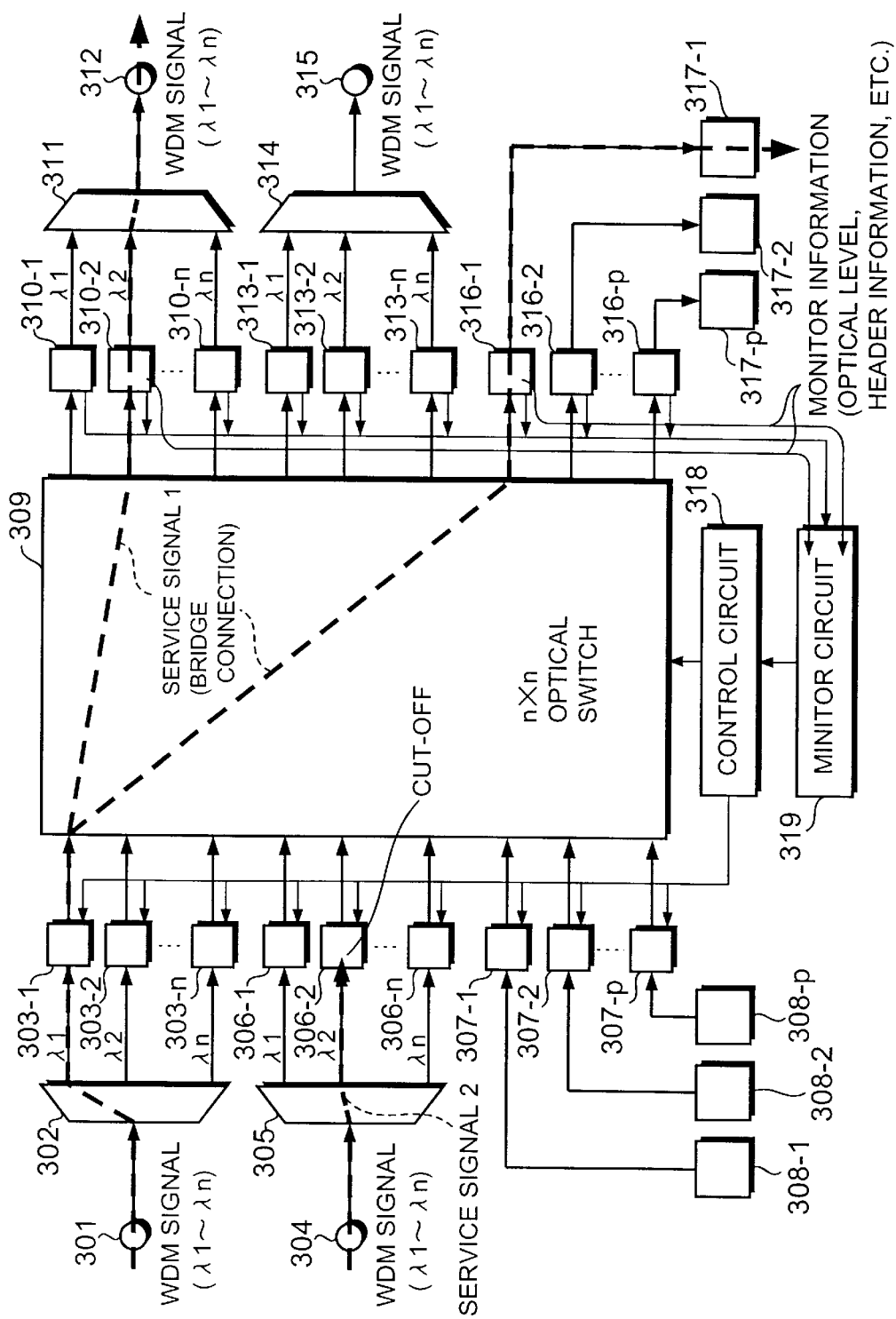
FIG. 34 is an explanatory diagram showing a bridge-connected state as well as showing the operation of the optical cross-connect in the fourth embodiment of the present invention.
Figure 35:
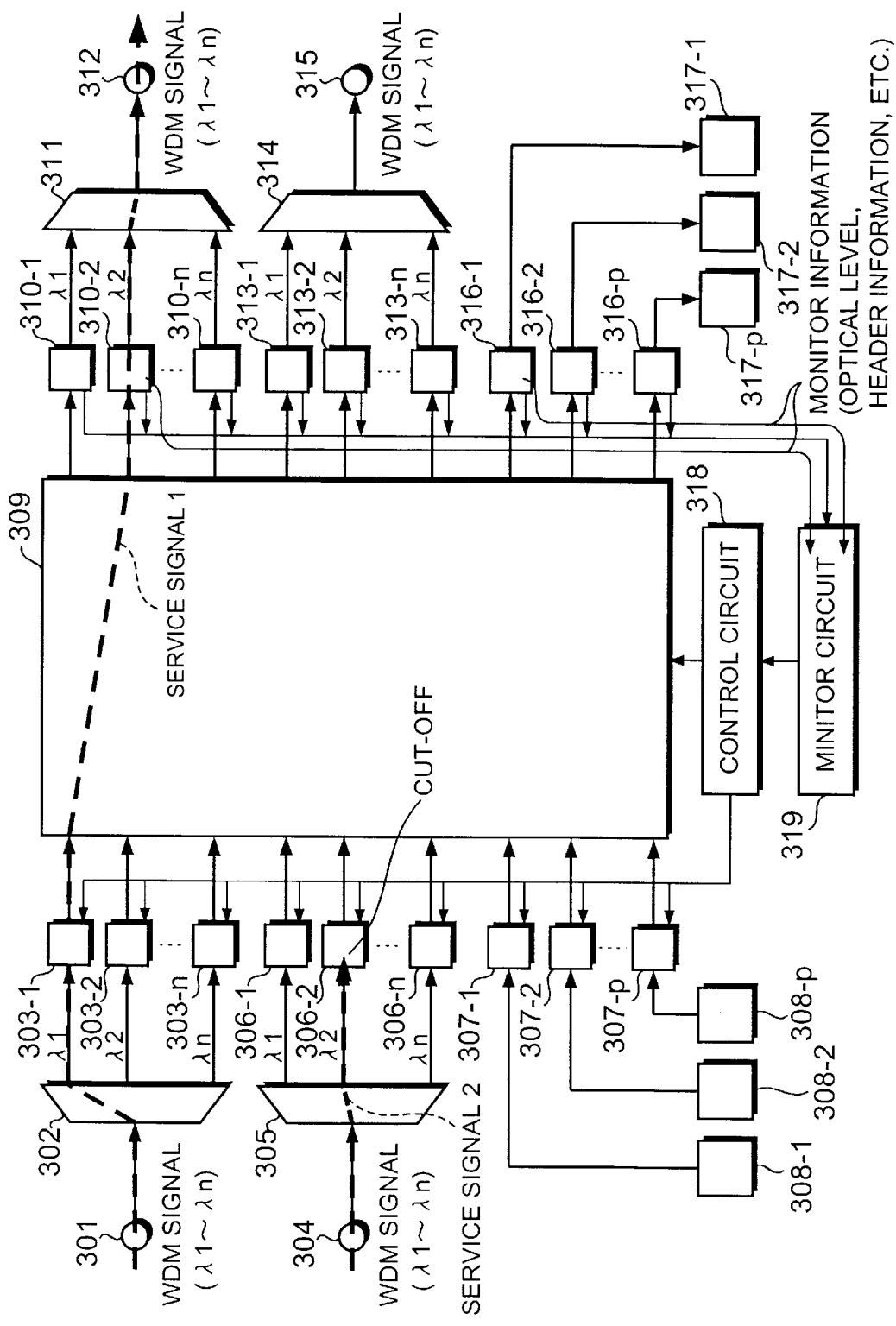
FIG. 35 is an explanatory diagram showing a state after switching over the optical path as well as showing the operation of the optical cross-connect in the fourth embodiment of the present invention.

FIGS. 33 to 35 are explanatory diagrams showing the operation of the optical cross-connect in the fourth embodiment of the present invention, as well as showing a state before switching over the optical path, a bridge-connected state and a state after switching over the optical path, respectively.

As illustrated in FIG. 33, in the state before switching over the optical path, with the optical path being set by the optical switch 309, the photo signal having the wavelength $\lambda 1$ (hereinafter called the "service signal 1" in the fourth embodiment) which has been inputted to the input terminal 301, is inputted to the optical transmission device 317-1 via the optical receiver 316-1. At the same time, the photo signal having the wavelength 22 (hereinafter called the "service signal 2" in the fourth embodiment) which has been inputted to the input terminal 304, is inputted to the output terminal 312 via the optical receiver 310-2. At this time, the optical receivers 310-2, 316-1 send to the connectivity monitor circuit 319 the monitor information (such as an optical level and header information) on the service signals 1, 2, thereby confirming a connected state.

The optical path is , it is herein assumed, switched over so that the service signal 1 is outputted as a signal having the wavelength $\lambda 2$ to the output terminal 312 while the service signal 2 is cut off. FIG. 31 shows an operation in a case where the optical path is thus switched over.

To begin with, the optical transmitter 306-2 cuts off the service signal 2 inputted to the input terminal 304, based on the signal given from the optical path switchover control circuit 318. The optical switch 309 sets, based on the signal coming from the optical path switchover control circuit 318, the optical path so that the service signals 1 having the wavelength $\lambda 1$ which have been inputted to the input terminal 301 are outputted simultaneously to both of the optical receivers 310-2 and 316-1, i.e., so that the bridge connection is established. In the state illustrated in FIG. 34, the monitor information on the service signal 1 is transmitted simultaneously from the optical receivers 310-2 and 316-1, and hence it can be confirmed in the connectivity monitor circuit 319 that the route for outputting the service signal 1 to the output terminal 312 via the optical receiver 310-2 is available and effective as well.

FIG. 35 shows the state after switching over the optical path. The connectivity monitor circuit 319 confirms that the route for outputting the service signal 1 to the output terminal 312 via the optical receiver 310-2 is available. After the confirmation has been made, the signal is transmitted to the control circuit 318, and the optical switch 309 is completely switched over, thus completing the switchover of the optical path for the service signal 1.

The n×n optical matrix switch used in the fourth embodiment is constructed in such a way that the optical wave-guide and the 2×2 optical switch elements formed on the substrate composed of such as $LiNbO_3$ (lithium niobate) and quartz series materials are combined.

The $LiNbO_3$-used 4×4 optical matrix switch employed herein is constructed by connecting and combining the 2×2 switch elements through the optical wave-guide. The photo signals inputted to the four input ports can be outputted to arbitrary ports, depending on a combination of the connected states of the respective 2×2 switch elements. Note that the principle and the operation of the optical switch are the same as those of the optical switch in the first embodiment.

In the optical cross-connect of the present invention, before completely switching over the optical path for the photo signals, the input of the optical switch is connected simultaneously (bridge-connected) to the plurality of outputs. It is confirmed that the signals can be received via the changed route and are classified as desired service signals, and, after the connectivity has been confirmed, the optical path is completely switched over. It is therefore feasible to grasp, before performing the switchover, a connection, a category and a state of quality of the service signal on the changed optical path, and the cut-off of the service signal due to the mis-setting and a failure in the system can be avoided.

Figure 36:
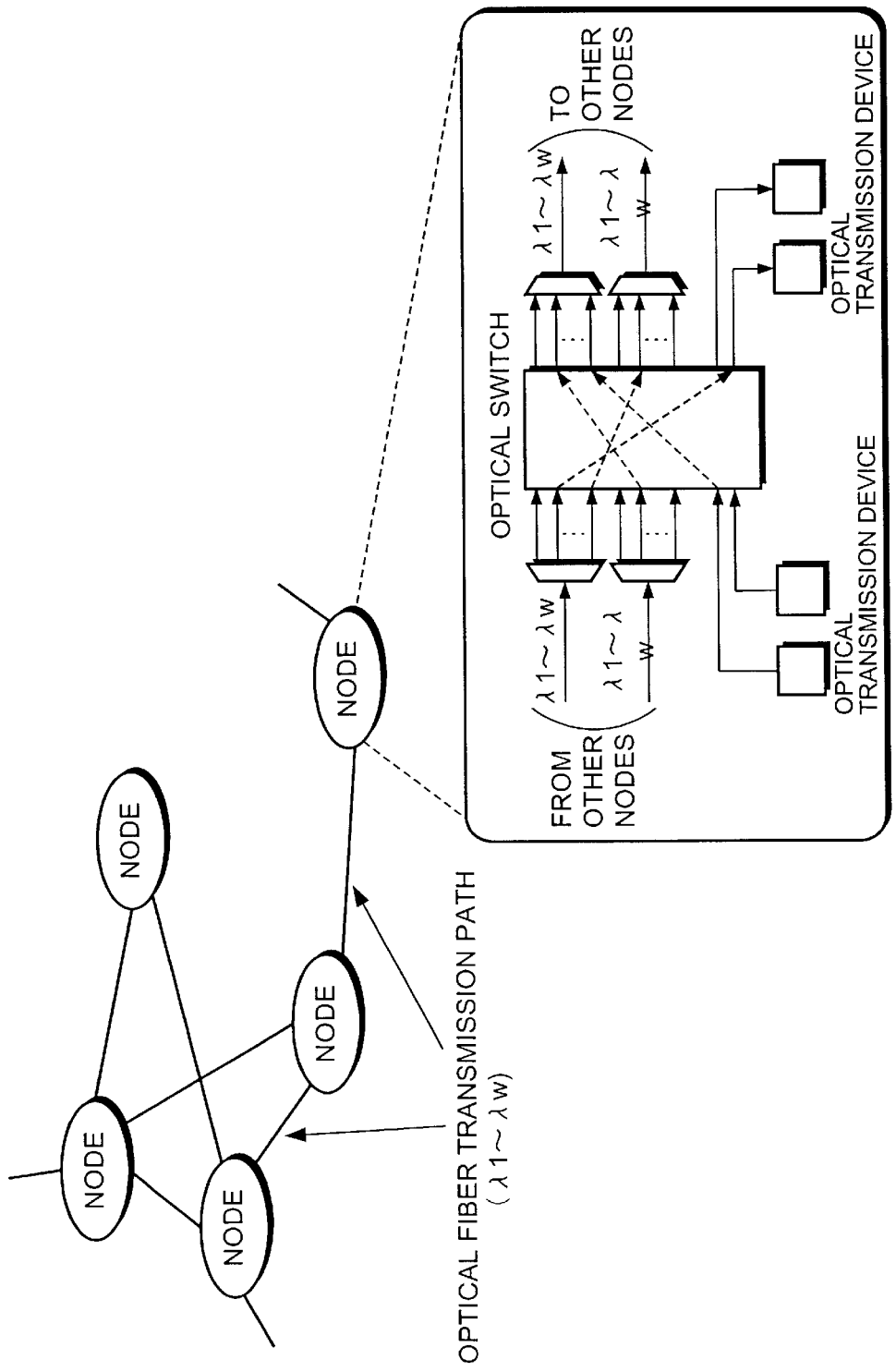
FIG. 36 is a diagram showing an architecture of a whole cross-connect network optical transmission system to which the optical cross-connect exemplified in the fourth embodiment of the present invention is applied.

FIG. 36 is a diagram showing an architecture of the whole optical cross-connect network system to which the optical cross-connect exemplified in the fourth embodiment of the present invention is applied.

The optical cross-connects as illustrated in FIG. 33 constitute the network system on the whole as shown in FIG. 36, and transmit the photo signals between the nodes. Accordingly, the input terminals 301, 303 and the output terminals 312, 315 in FIG. 31 are respectively connected to other desired nodes, and, with the route being set by the m×m optical switch, the transmission route for the photo signals is arbitrarily set. Further, FIG. 36 illustrates the architecture in which the I/O terminals are each provided by twos. However, the number of the terminals is not restricted.

As discussed above, the optical cross-connect of the present invention takes such a construction that the input of the optical switch is connected (bridge-connected) simultaneously to the plurality of outputs before completely switching over the route for the photo signals, then it is confirmed that the changed route is available and effective, and, after the connectivity has been confirmed, the optical path is completely switched over. It is therefore feasible to grasp, before performing the switchover, a connection and a state of quality of the service signal on the changed optical path, and there is obtained the effect that the cut-off of the service signal due to the mis-setting and a failure in the system can be avoided.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. An optical cross-connect comprising:
at least two photo signal input terminals for respectively inputting photo signals;
at least two photo signal output terminals for outputting the photo signals;
an optical switch for switching over an optical path between said photo signal input terminal and said photo signal output terminal; and
a control circuit for controlling said optical switch,
wherein if an optical path is to be switched over to a switchover target photo signal output terminal to which an optical path is newly connected from a pre-switchover photo signal output terminal, through which said photo signal input terminal and the optical path are connected before the switchover, of said photo signal output terminals, said optical switch temporarily connects the optical path to both of said pre-switchover photo signal output terminal and said switchover target photo signal output terminal.

2. An optical cross-connect according to claim 1, further comprising a second monitor circuit, disposed between said optical switch and each of said photo signal output terminals, for monitoring a state of the output photo signal outputted from said optical switch.

3. An optical cross-connect according to claim 2, further comprising a first monitor circuit, disposed between said optical switch and each of said photo signal input terminals, for monitoring a state of the input photo signal inputted to said optical switch.

4. An optical cross-connect according to claim 2, further comprising a connectivity monitor circuit for monitoring a connectivity of said optical switch in accordance with connectivity information obtained from the state of the output photo signal, and outputting a control signal to said control circuit so that said optical switch executes, when a predetermined fiducial quality of signal is satisfied, a complete switchover to said switchover target photo signal output terminal from said pre-switchover photo signal output terminal.

5. An optical cross-connect according to claim 3, further comprising a connectivity monitor circuit for monitoring a connectivity of said optical switch in accordance with connectivity information obtained from the state of each of the input photo signal and the output photo signal, and outputting a control signal to said control-circuit so that said optical switch executes, when a predetermined fiducial quality of signal is satisfied, a complete switchover to said switchover target photo signal output terminal from said pre-switchover photo signal output terminal.

6. An optical cross-connect according to claim 4, wherein the connectivity information is an optical level of each of the input photo signal and the output photo signal.

7. An optical cross-connect according to claim 6, wherein the connectivity information is header information added to the input photo signal and the output photo signal.

8. An optical cross-connect according to claim 1, further comprising a photo signal cut-off unit, disposed between each of said photo signal input terminals and said optical switch, for cutting off the photo signal inputted to said optical switch from said photo signal input terminal.

9. An optical cross-connect according to claim 8, wherein said control circuit includes a photo signal cut-off control circuit for controlling said photo signal cut-off unit to cut off the photo signal inputted to said photo signal cut-off unit corresponding to said photo signal input terminal connected to said switchover target photo signal output terminal before switchover of the optical path during at least a period for which the optical path is connected to both of said pre-switchover photo signal output terminal and said switchover target photo signal output terminal.

10. An optical cross-connect according to claim 1, wherein said optical switch includes a wave-guide type optical switch.

11. An optical cross-connect according to claim 10, wherein said wave-guide type optical switch includes a wave-guide type optical switch with a substrate composed of lithium niobate.

12. An optical cross-connect according to claim 3, wherein said first monitor circuit and said second monitor circuit include:
a first optical splitter for splitting a part of the input photo signal and outputting the split input photo signal; and
a light receiving element for monitoring the split input photo signal, respectively.

13. An optical cross-connect according to claim 3, wherein said first monitor circuit and said second monitor circuit include:
an optical level monitor circuit for monitoring an optical level of the input photo signal;
a photoelectric converter for converting the input photo signal into an electric signal; and
an electro-optic converter for converting the electric signal into a photo signal, respectively.

14. An optical cross-connect according to claim 3, wherein said first monitor circuit and said second monitor circuit include:
a photoelectric converter for converting the input photo signal into an electric signal;

an electric signal monitor circuit for monitoring the electric signal; and an electro-optic converter for converting the electric signal into a photo signal, respectively.

15. An optical cross-connect according to claim 3, wherein said first monitor circuit and said second monitor circuit include:

a photoelectric converter for converting the input photo signal into an electric signal;

a header terminating circuit for terminating a header added to the photo signal; and an electro-optic converter for converting the electric signal into a photo signal, respectively.

16. A method of switching over an optical path in an optical cross-connect comprising at least two photo signal input terminals, at least two photo signal output terminals, and an optical path switchover circuit for switching over an optical path between said photo signal input terminal and said photo signal output terminal, said method comprising:

inputting a photo signal to an optical switch from said photo signal input terminal;

outputting the photo signal to only a pre-switchover photo signal output terminal to which an optical path is connected before the switchover;

outputting the photo signals to both of said pre-switchover photo signal output terminal and a switchover target photo signal output terminal; and outputting the photo signal to only said switchover target photo signal output terminal.

17. A method of switching over an optical path in an optical cross-connect comprising at least two photo signal input terminals, at least two photo signal output terminals, an optical switch for switching over an optical path between said photo signal input terminal and said photo signal output terminal, and a second monitor circuit disposed between said optical switch and each of said photo signal output terminals, said method comprising:

inputting a photo signal to said optical switch from said photo signal input terminal;

outputting the photo signal to only a pre-switchover photo signal output terminal to which an optical path is connected before the switchover;

outputting the photo signals to both of said pre-switchover photo signal output terminal and a switchover target photo signal output terminal; and monitoring a switchover target photo signal outputted from said switchover target photo signal output terminal by said second monitor circuit; and switching over the optical path so that the photo signal is outputted to only said switchover target photo signal output terminal when the switchover target photo signal satisfies a predetermined fiducial quality of signal.

18. A method of switching over an optical path using an optical cross-connect comprising at least two photo signal input terminals, at least two photo signal output terminals, an optical switch for switching over an optical path between said photo signal input terminal and said photo signal output terminal, a first monitor circuit disposed between said optical switch and each of said photo signal input terminals, and a second monitor circuit disposed between said optical switch and each of said photo signal output terminals, said method comprising:

inputting a photo signal to the optical switch from said photo signal input terminal;

outputting the photo signal to only a pre-switchover photo signal output terminal to which an optical path is connected before the switchover;

outputting the photo signals to both of said pre-switchover photo signal output terminal and a switchover target photo signal output terminal;

monitoring an input photo signal inputted to said optical switch by said first monitor circuit;

monitoring a switchover target photo signal outputted from said switchover target photo signal output terminal by said second monitor circuit; and switching over the optical path so that the photo signal is outputted to only said switchover target photo signal output terminal when the input photo signal and the switchover target photo signal are compared to find that a predetermined fiducial quality of signal is satisfied.

19. A method of switching over an optical path in an optical cross-connect according to claim 18, wherein said optical cross-connect further comprises a photo signal cut-off unit provided on each input side of said optical switch, and wherein at least said bridge-connecting step includes a photo signal cut-off step of cutting off, by means of said photo signal cut-off unit, an input of the photo signal to said optical switch from said photo signal input terminal connected to said switchover target photo signal output terminal before the switchover.

20. An optical cross-connect comprising:

a transmission-path-side input terminal for inputting a transmission path input photo signal transmitted from an optical transmission path;

a transmitter-side input terminal for inputting a transmission photo signal transmitted from an optical transmitter;

a transmission-path-side output terminal for outputting a transmission path output photo signal transmitted to the optical transmission path;

a receiver-side output terminal for outputting a receiving photo signal transmitted to an optical receiver;

an optical switch for switching over an optical path between a photo signal input terminal including said transmission-path-side input terminal and said transmitter-side input terminal, and a photo signal output terminal including said transmission-path-side output terminal and said receiver-side output terminal;

a second monitor circuit, disposed between said optical switch and each of said photo signal output terminals, for monitoring a state of the output photo signal outputted from said optical switch; and a first monitor circuit, disposed between said optical switch and each of said photo signal output terminals, for monitoring a state of the input photo signal inputted to said optical switch, wherein said optical switch includes bridge connecting circuit for, when an optical path is switched over to a switchover target photo signal output terminal to which the optical path is newly connected from a pre-switchover photo signal output terminal through which the optical path is connected to said photo signal input terminal before the switchover, temporarily connecting the optical path to both of said pre-switchover photo signal output terminal and said switchover target photo signal output terminal.

21. An optical cross-connect according to claim 20, further comprising a photo signal cut-off unit for cutting off an input of the transmission photo signal to said optical switch during a period for which a bridge connecting circuit temporarily connects the optical path to both of said pre-switchover photo signal output terminal and said switchover target photo signal output terminal.

22. An optical cross-connect according to claim 20, wherein said optical receiver includes a connectivity information detecting circuit for detecting connectivity information by receiving a photo signal outputted from said receiver-side output terminal.

23. An optical cross-connect according to claim 21, further comprising a connectivity monitor circuit for monitoring a connectivity of said optical switch from the connectivity information.

24. An optical cross-connect according to claim 23, wherein said connectivity monitor circuit, when connectivity information satisfies a predetermined fiducial quality of signal, transmits a control signal to a control circuit so that said optical switch executes a complete switchover from said transmission-path-side output terminal to said receiver-side output terminal.

25. An optical cross-connect according to claim 22, wherein the connectivity information is an optical level of each of the input photo signal and the output photo signal.

26. An optical cross-connect according to claim 22, wherein the connectivity information is header information added to the input photo signal and to the output photo signal.

27. An optical cross-connect according to claim 22, wherein said optical switch includes a wave-guide type optical switch.

28. An optical cross-connect according to claim 22, wherein said wave-guide type optical switch includes a wave-guide type optical switch with a substrate composed of lithium niobate.

29. An optical cross-connect according to claim 20, wherein said first monitor circuit and said second monitor circuit include:
   a first optical splitter for splitting a part of the input photo signal and outputting the split input photo signal; and
   a light receiving element for monitoring the split input photo signal, respectively.

30. An optical cross-connect according to claim 20, wherein said first monitor circuit and said second monitor circuit include:
   an optical level monitor circuit for monitoring an optical level of the input photo signal;
   a photoelectric converter for converting the input photo signal into an electric signal; and
   an electro-optic converter for converting the electric signal into a photo signal, respectively.

31. An optical cross-connect according to claim 20, wherein said first monitor circuit and said second monitor circuit include:
   a photoelectric converter for converting the input photo signal into an electric signal;
   an electric signal monitor circuit for monitoring the electric signal; and
   an electro-optic converter for converting the electric signal into a photo signal, respectively.

32. An optical cross-connect according to claim 20, wherein said first monitor circuit and said second monitor circuit include:
   a photoelectric converter for converting the input photo signal into an electric signal;
   a header terminating circuit for terminating a header added to the photo signal; and
   an electro-optic converter-for converting the electric signal into a photo signal, respectively.

33. An optical ADM (Add/Drop Multiplexer) having a plurality of optical cross-connects as claimed in claim 20, comprising:
   an optical demultiplexer for demultiplexing transmission path input photo signals which are wavelength-multiplexed and outputting the demultiplexed photo signals to each of said optical cross-connects, the transmission path input signal, the transmission photo signal, the receiving photo signal and the transmission path output signal being inputted to said one optical cross-connect and classified as photo signals belonging to the same wavelength band, and the transmission path photo signals being inputted to each of said optical cross-connects and having wavelengths different from each other; and
   an optical coupler for coupling the transmission path output signals and.outputting the coupled photo signals.

34. An optical transmission device with at least one unit of said optical ADM, as claimed in claim 33, disposed on a transmission path, said optical ADM comprising:
   a transmitting unit including: an optical transmission terminal node, disposed at a transmitting-side terminal of the transmission path, for transmitting photo signals belonging to respective wavelength bands; and a transmitting-side optical coupler for coupling the photo signals and transmitting wavelength-multiplexed photo signals to the transmission path; and
   a receiving unit including: an optical demultiplexer, disposed at a receiving-side terminal of the transmission path, for demultiplexing the wavelength-multiplexed photo signals into the photo signals belonging to the respective wavelength bands; and an optical receiving terminal node for receiving the respective photo signals.

35. An optical ADM using an optical cross-connect comprising:
   a plurality of transmission-path-side input terminals for respectively inputting transmission path input photo signals transmitted respectively from a plurality of optical transmission paths;
   a transmitter-side input terminal for inputting a transmission photo signal transmitted from an optical transmitter;
   transmission-path-side output terminals for respectively outputting the transmission path output photo signals respectively transmitted to the plurality of optical transmission paths;
   a receiver-side output terminal for outputting the receiving photo signal transmitted to an optical receiver; and
   an optical switch for switching over an optical path between a photo signal input terminal including said transmission-path-side input terminal and said transmitter-side input terminal, and a photo signal output terminal including said transmission-path-side output terminal and said receiver-side output terminal,
   wherein said optical switch includes a bridge connecting circuit for, when an optical path is switched over to a switchover target photo signal output terminal to which the optical path is newly connected from a pre-switchover photo signal output terminal through which the optical path is connected to said photo signal input terminal before the switchover, temporarily connecting the optical path to both of said pre-switchover photo signal output terminal and said switchover target photo signal output terminal.

36. An optical ADM according to claim 35, wherein the transmission path input photo signals are wavelength-multiplexed photo signals in which the photo signals belonging to wavelength bands different from each other are wavelength-multiplexed, wherein said optical ADM using said optical cross-connect includes:

said optical transmitters, said optical receivers, said transmission path input terminals, said transmission path output terminals, said transmitter-side input terminals and receiver-side output terminals, of which the numbers each correspond to the number of the photo signals belonging to the wavelength bands;

an optical demultiplexer, disposed between each of the transmission paths and said photo signal input terminal, for demultiplexing the wavelength-multiplexed photo signals into the photo signals having the respective wavelength bands; and an optical coupler, disposed between said photo signal output terminal and the transmission path, for wavelength-multiplexing the photo signals and outputting the wavelength-multiplexed photo signals to the transmission path, and wherein said optical switch includes a bridge connecting circuit for, when an optical path is switched over to a switchover target photo signal output terminal to which the optical path is newly connected from a pre-switchover photo signal output terminal through which the optical path is connected to said photo signal input terminal before the switchover between said photo signal input terminal and said photo signal output terminal of the photo signals belonging to the same wavelength band, temporarily connecting the optical path to both of said pre-switchover photo signal output terminal and said switchover target photo signal output terminal.

37. An optical ADM according to claim 35, further comprising a second monitor circuit, disposed between said optical switch and said photo signal outputting means, for monitoring a state of the output photo signal outputted from said optical switch.

38. An optical ADM according to claim 37, further comprising a first monitor circuit, disposed between said optical switch and each of said photo signal input terminals, for monitoring a state of the input photo signal inputted to said optical switch.

39. An optical ADM according to claim 38, further comprising a connectivity monitor circuit for monitoring a connectivity of said optical switch from the connectivity information contained in the output photos signal and the input photo signal.

40. An optical ADM according to claim 39, wherein said connectivity monitor circuit, when the connectivity information satisfies a predetermined fiducial level, transmits a control signal to a control circuit so that said optical switch executes a complete switchover from said pre-switchover photo signal output terminal to said switchover target photo signal output terminal.

41. An optical ADM according to claim 40, further comprising a photo signal cut-off unit, disposed between each of said photo signal input terminals and said optical switch, for cutting off the photo signal to be inputted to said optical switch from said photo signal input terminal.

42. An optical ADM according to claim 41, wherein said control circuit includes a photo signal cut-off control circuit for controlling said photo signal cut-off unit to cut off the photo signal to be inputted to said photo signal cut-off unit corresponding to said photo signal input terminal connected to said switchover target photo signal output terminal before switching over the optical path.

43. An optical ADM according to claim 39, wherein the connectivity information is an optical level of each of the input photo signal and the output photo signal.

44. An optical ADM according to claim 39, wherein the connectivity information is header information added to the input photo signal and to the output photo signal.

45. An optical ADM according to claim 36, wherein said optical switch includes a wave-guide type optical switch.

46. An optical ADM according to claim 45, wherein said wave-guide type optical switch includes a wave-guide type optical switch with a substrate composed of lithium niobate.

47. An optical ADM according to claim 38, wherein said first monitor circuit includes:

a first optical splitter for splitting a part of the input photo signal and outputting the split input photo signal; and a light receiving element for monitoring the split input photo signal.

48. An optical ADM according to claim 38, wherein said first monitor circuit includes:

an optical level monitor circuit for monitoring an optical level of the input photo signal;

a photoelectric converter for converting the input photo signal into an electric signal; and an electro-optic converter for converting the electric signal into a photo signal.

49. An optical ADM according to claim 38, wherein said first monitor circuit includes:

a photoelectric converter for converting the input photo signal into an electric signal;

an electric signal monitor circuit for monitoring the electric signal; and an electro-optic converter for converting the electric signal into a photo signal.

50. An optical ADM according to claim 38, wherein said first monitor circuit includes:

a photoelectric converter for converting the input photo signal into an electric signal;

a header terminating circuit for terminating a header added to the photo signal; and an electro-optic converter for converting the electric signal into a photo signal.

51. An optical cross connect network system comprising:

a multiplicity of said optical ADMs, as claimed in claim 36, arranged therein; and optical cross-connects each having an optical ADM function and connected as a network.

* * * * *